United States Patent
Young et al.

(10) Patent No.: US 10,794,335 B2
(45) Date of Patent: Oct. 6, 2020

(54) FUEL TANK PRESSURE REGULATOR

(71) Applicant: Stant USA Corp., Connersville, IN (US)

(72) Inventors: Kevin L. Young, Connersville, IN (US); John Brian Anderson, Liberty, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 16/429,691

(22) Filed: Jun. 3, 2019

(65) Prior Publication Data

US 2019/0368445 A1    Dec. 5, 2019

Related U.S. Application Data

(60) Provisional application No. 62/679,362, filed on Jun. 1, 2018.

(51) Int. Cl.
| F02M 1/00 | (2006.01) |
| F02M 25/08 | (2006.01) |
| B60K 15/035 | (2006.01) |

(52) U.S. Cl.
CPC ..... F02M 25/089 (2013.01); B60K 15/03504 (2013.01)

(58) Field of Classification Search
CPC ............... F02D 2250/02; F02M 25/08; F02M 25/0836; F02M 25/0872; F02M 55/007
USPC ................................................. 123/516–520
See application file for complete search history.

(56) References Cited

U.S. PATENT DOCUMENTS

| 3,872,878 A | 3/1975 | Kozel et al. |
| 4,387,878 A | 6/1983 | Zukausky |
| 4,392,507 A | 7/1983 | Harris |
| 4,651,971 A | 3/1987 | Donahue, Jr. |
| 4,715,403 A | 12/1987 | Szlaga |
| 4,742,844 A | 5/1988 | Szlaga |
| 4,805,663 A | 2/1989 | Szlaga |
| 4,869,461 A | 9/1989 | Perry et al. |
| 5,069,188 A | 12/1991 | Cook |
| 5,111,795 A | 5/1992 | Thompson |
| 5,419,367 A | 5/1995 | Noya |
| 5,584,278 A | 12/1996 | Satoh et al. |
| 5,605,177 A | 2/1997 | Ohashi et al. |
| 6,003,499 A | 12/1999 | Devall et al. |
| 6,386,222 B1 | 5/2002 | Harris |
| 6,481,592 B2 | 11/2002 | Harris |
| 6,561,211 B2 | 5/2003 | Devall |
| 6,779,544 B2 | 8/2004 | Devall |
| 7,228,850 B2 | 6/2007 | King |
| 7,255,094 B2 | 8/2007 | King |
| 7,270,117 B1 | 9/2007 | Devall |
| 7,270,310 B2 | 9/2007 | Takakura |
| 7,325,577 B2 | 2/2008 | Devall |
| 7,409,946 B2 | 8/2008 | King |
| 7,481,412 B2 | 1/2009 | Ishikawa et al. |

(Continued)

FOREIGN PATENT DOCUMENTS

JP    2013170506 A    9/2013

*Primary Examiner* — John Kwon
(74) *Attorney, Agent, or Firm* — Barnes & Thornburg LLP

(57) ABSTRACT

A fuel tank vent system includes a venting apparatus for regulating discharge of fuel vapor from a fuel tank and admission of outside air into a fuel tank. The vent valve is used to regulate pressure in a fuel tank.

13 Claims, 19 Drawing Sheets

(56) References Cited

U.S. PATENT DOCUMENTS

Figure 1:
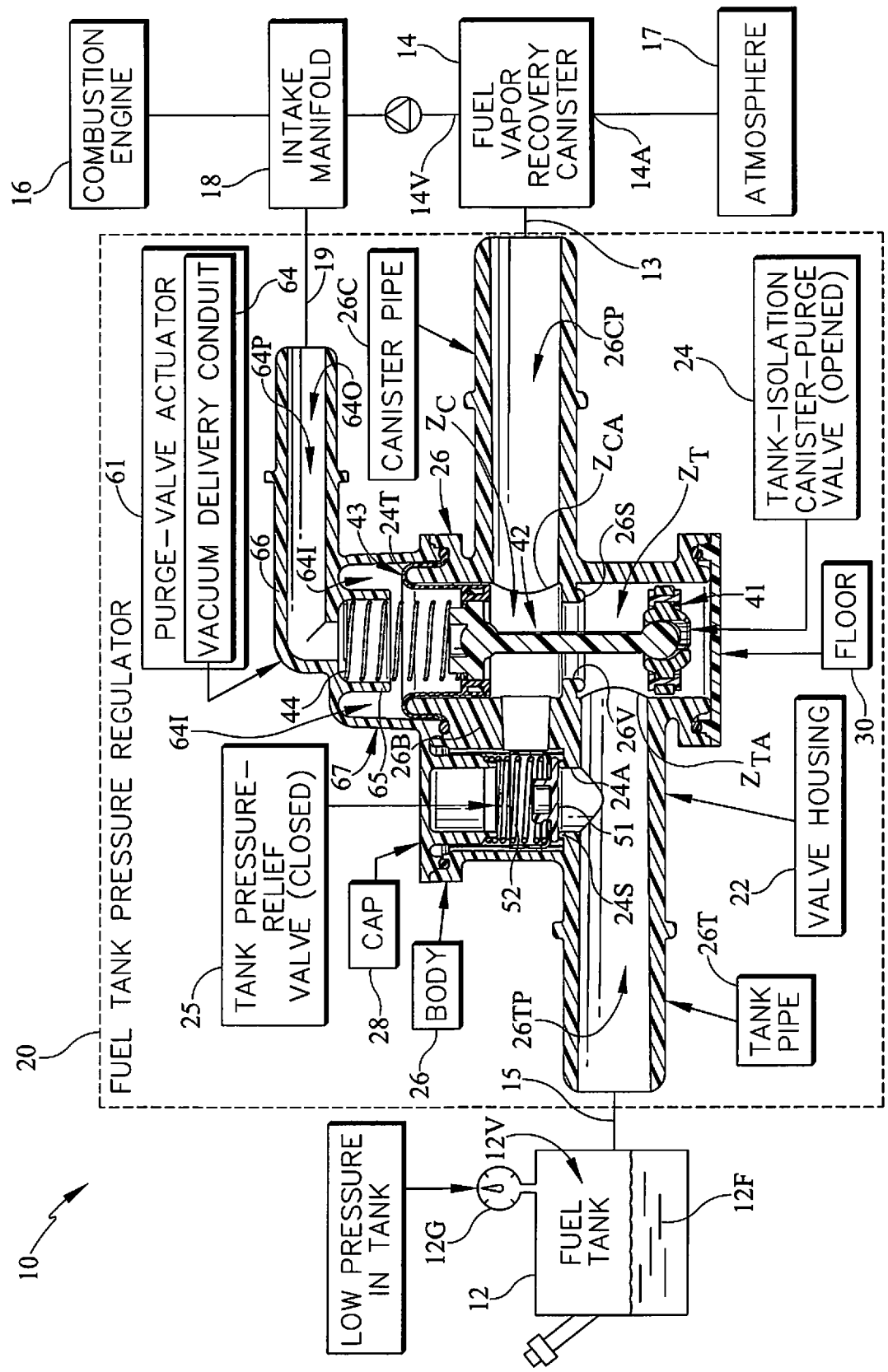

| | | |
|---|---|---|
| 7,527,044 B2 | 5/2009 | Dunkle et al. |
| 7,556,067 B2 | 7/2009 | McClung |
| 7,568,494 B2 | 8/2009 | Devall |
| 7,823,610 B2 | 11/2010 | King |
| 8,215,290 B2 | 7/2012 | Dunkle et al. |
| 8,573,255 B2 | 11/2013 | Pifer et al. |
| 8,584,704 B2 | 11/2013 | Pifer et al. |
| 8,833,573 B2 | 9/2014 | Tomaszewski et al. |
| 8,844,561 B2 | 9/2014 | Keller et al. |
| 8,944,101 B2 | 2/2015 | Pifer et al. |
| 9,359,977 B2 | 6/2016 | Brock et al. |
| 9,371,803 B2 | 6/2016 | Pifer et al. |
| 9,611,814 B2 | 4/2017 | Dudar |
| 9,694,310 B2 | 7/2017 | Anderson et al. |
| 9,732,685 B2 | 8/2017 | Dudar |
| 9,902,258 B2 | 2/2018 | Young |
| 10,018,161 B2 | 7/2018 | Anderson et al. |
| 2001/0017160 A1 | 8/2001 | Ishigaki et al. |
| 2006/0185735 A1 | 8/2006 | Tsuge et al. |
| 2006/0207663 A1 | 9/2006 | Tsuge |
| 2007/0101974 A1 | 5/2007 | Achor |
| 2007/0261752 A1 | 11/2007 | McClung et al. |
| 2009/0139495 A1 | 6/2009 | Crawford |
| 2010/0269921 A1 | 10/2010 | Pifer et al. |
| 2011/0240145 A1 | 10/2011 | Pifer |
| 2012/0073548 A1 | 3/2012 | Lee et al. |
| 2014/0026865 A1* | 1/2014 | Dudar ............... F02M 25/0818 123/518 |
| 2015/0144819 A1 | 5/2015 | Pifer et al. |
| 2016/0038870 A1 | 2/2016 | Anderson et al. |
| 2016/0177882 A1* | 6/2016 | Dudar .................. F02D 41/003 701/22 |
| 2016/0298778 A1* | 10/2016 | Young ............... F02M 25/0836 |
| 2016/0311315 A1* | 10/2016 | Young ............... B60K 15/03519 |
| 2017/0067414 A1* | 3/2017 | Dudar .................. G07C 5/0816 |
| 2017/0260932 A1* | 9/2017 | Brock ............. B60K 15/03504 |

* cited by examiner

US 10,794,335 B2

FUEL TANK PRESSURE REGULATOR

PRIORITY CLAIM

This application claims priority under 35 U.S.C. § 119(e) to U.S. Provisional Application No. 62/679,362, filed Jun. 1, 2018, which is expressly incorporated by reference herein.

BACKGROUND

The present disclosure relates to fuel tank vent valves. More particularly, the present disclosure relates to vent valves for regulating discharge of fuel vapor from a fuel tank to a carbon canister in a fuel vapor treatment system.

Vehicle fuel systems include valves associated with the fuel tank and are configured to vent pressurized or displaced fuel vapor from the vapor space in the fuel tank to a carbon canister outside the fuel tank. The carbon canister is designed to capture and store hydrocarbons entrained in fuel vapors that are displaced from the fuel tank during a typical refueling operation or that are otherwise vented from the fuel tank. Later, when the vehicle engine is running, a vacuum is applied to the carbon canister by an intake manifold associated with the engine to re-entrain the stored hydrocarbons to mix with air drawn into the carbon canister from the atmosphere to generate fuel vapor that is burned in the engine.

SUMMARY

The present disclosure provides a fuel storage system for a vehicle including a fuel tank pressure regulator. In illustrative embodiments, the fuel tank pressure regulator is configured to control the flow of fuel vapor from a fuel tank to a fuel vapor recovery canister and ultimately to an associated combustion engine based on whether or not the combustion engine is running.

In illustrative embodiments, the fuel tank pressure regulator includes a pneumatic tank-isolation, canister-purge valve that is normally open to allow a free flow of fuel vapor from the fuel tank to the vapor recovery canister but is closed automatically during each canister purge activation cycle by exposure to a vacuum generated in the combustion engine and applied by the intake manifold. During such a canister purge activation cycle, the fuel tank pressure regulator in accordance with the present disclosure does not use any vacuum generated by the combustion engine to pull fuel vapor from the fuel tank to the fuel vapor recovery canister. Instead, most of that vacuum is used to cleanse hydrocarbons from the fuel vapor recovery canister. Only some of that vacuum is used to activate the tank-isolation, purge-control valve included in the fuel tank pressure regulator to block flow of fuel vapor from the fuel tank to the fuel vapor recovery canister during the canister purge activation cycle. Accordingly, the pneumatic fuel tank pressure regulator manages the flow of fuel vapor without an electronic control and maximizes cleansing of the fuel vapor recovery canister during a canister purge activation cycle.

In illustrative embodiments, the pneumatic fuel tank pressure regulator includes a pressure-controlled valve that primarily governs the flow of fuel vapor from the fuel tank to the fuel vapor recovery canister. Accordingly, the pneumatic fuel tank pressure regulator manages the flow of fuel vapor without an electronic control.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
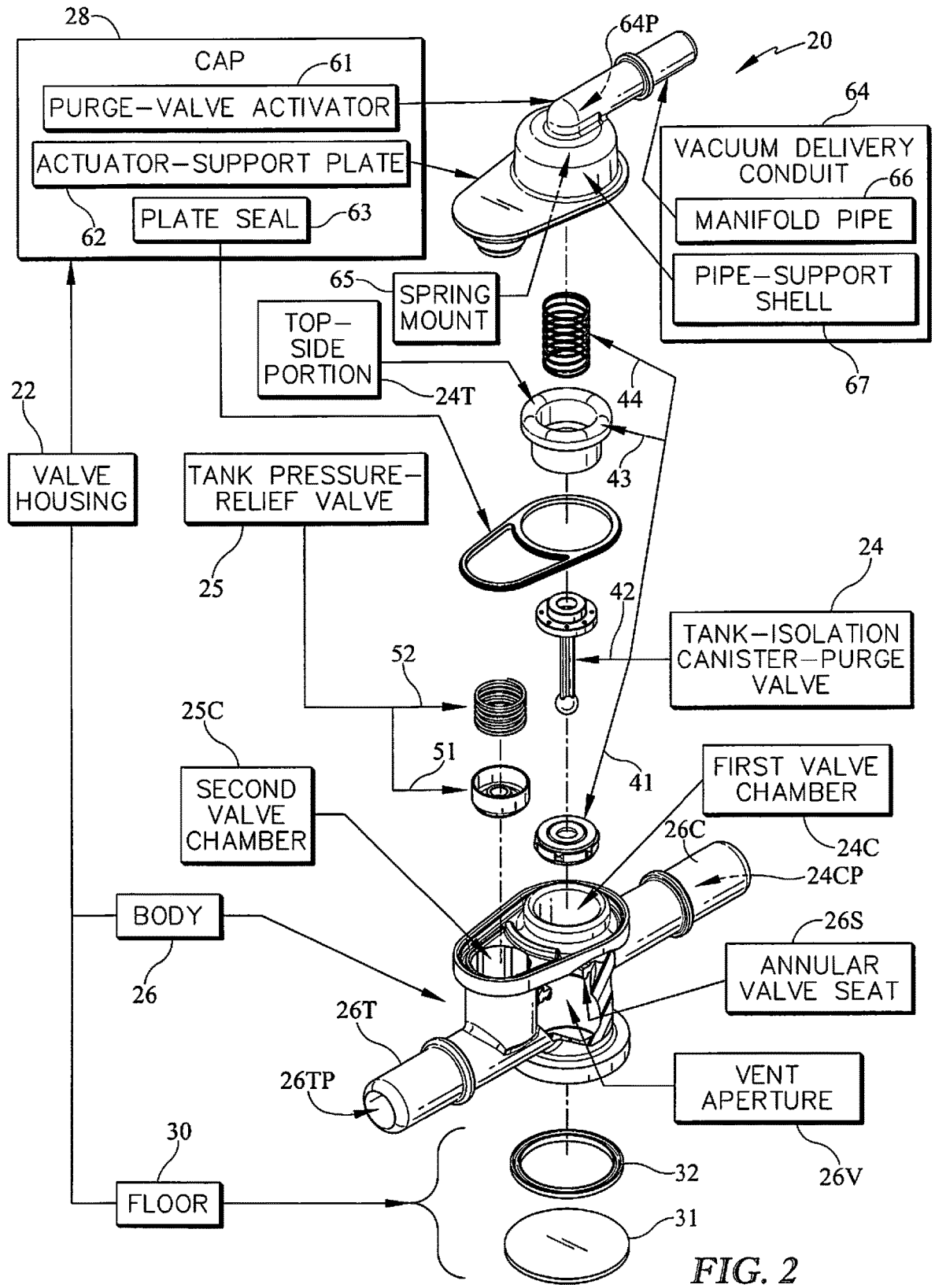
Figure 3:
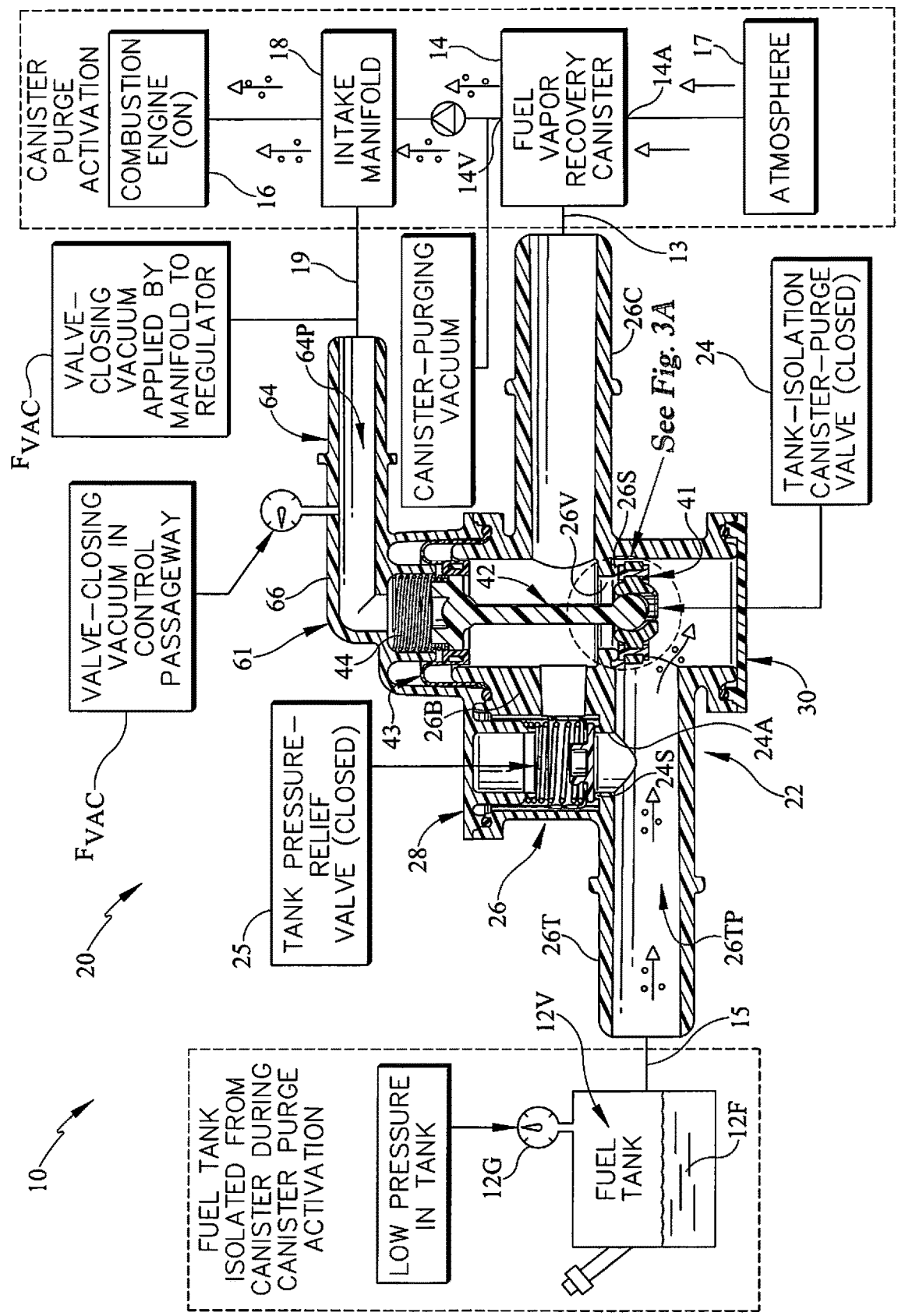
Figure 3A:
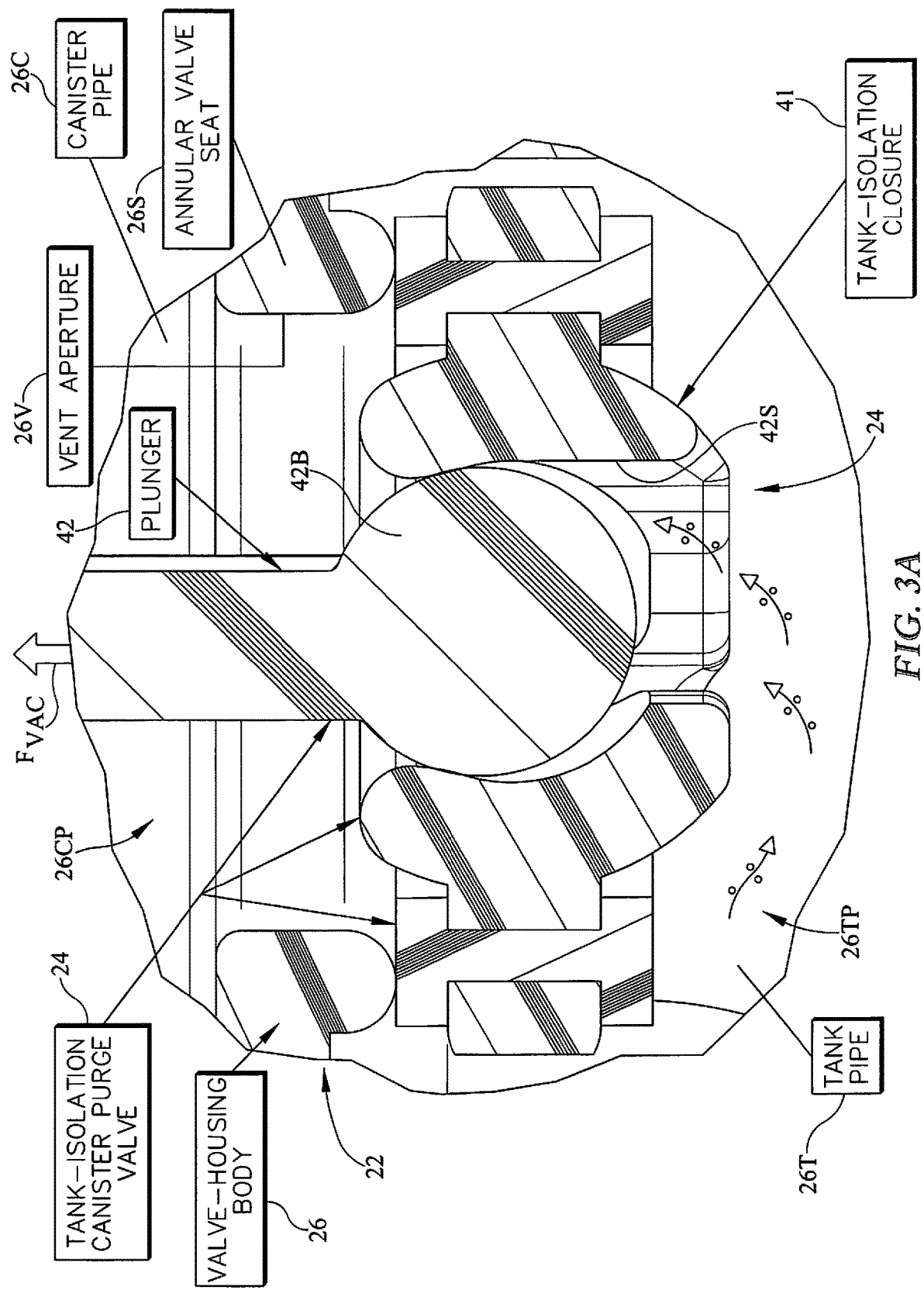
Figure 4:
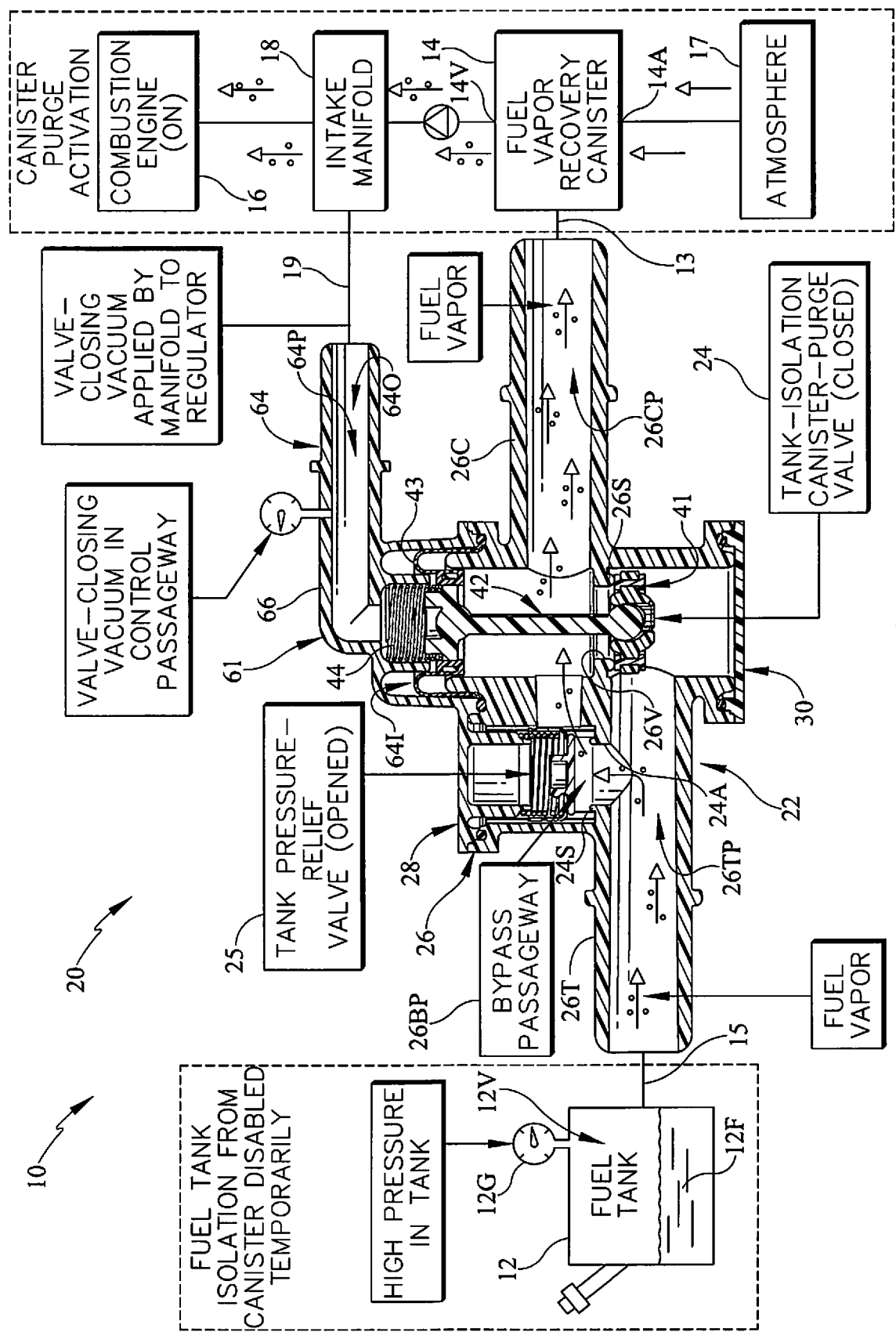
Figure 5:
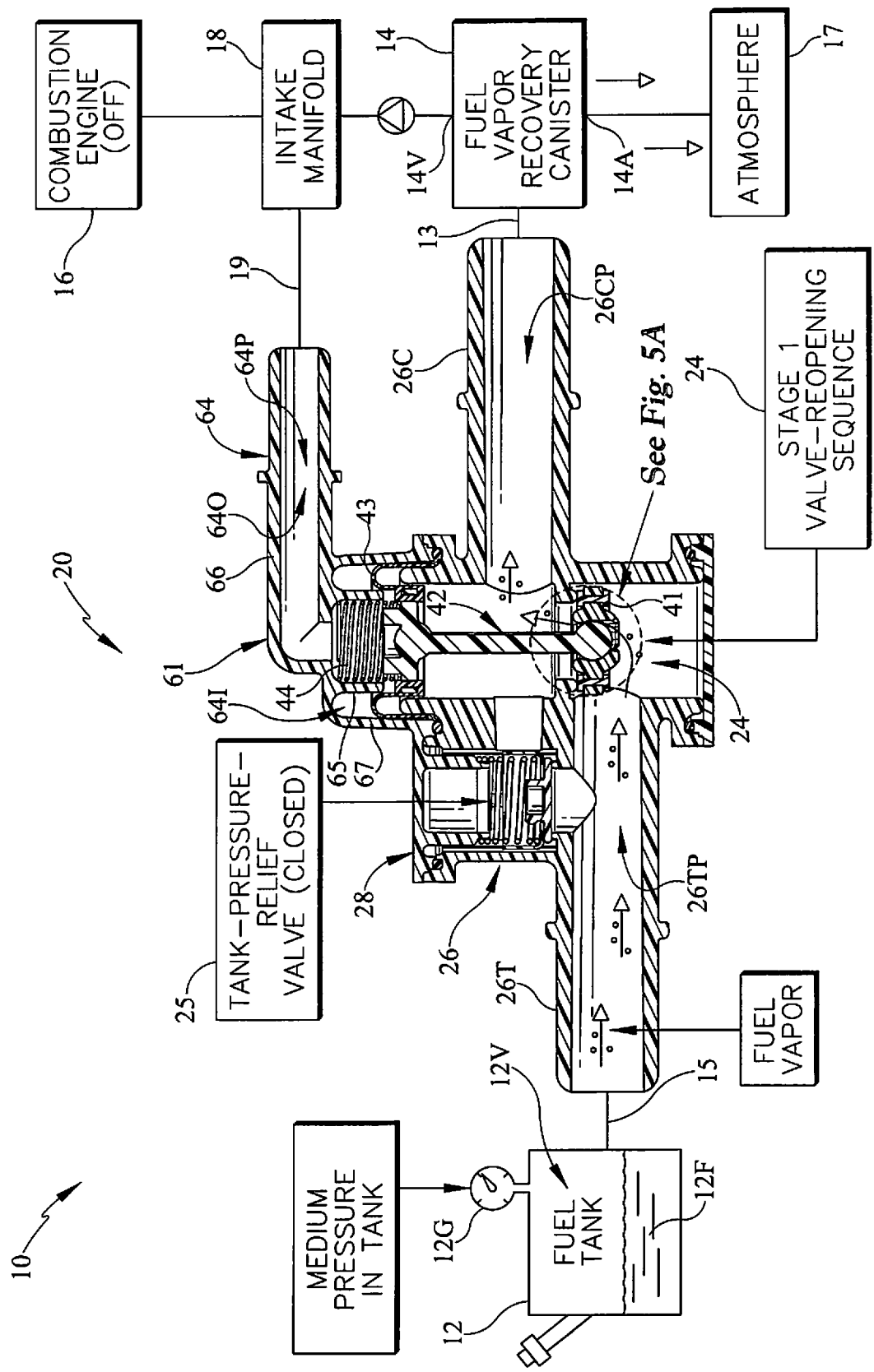
Figure 5A:
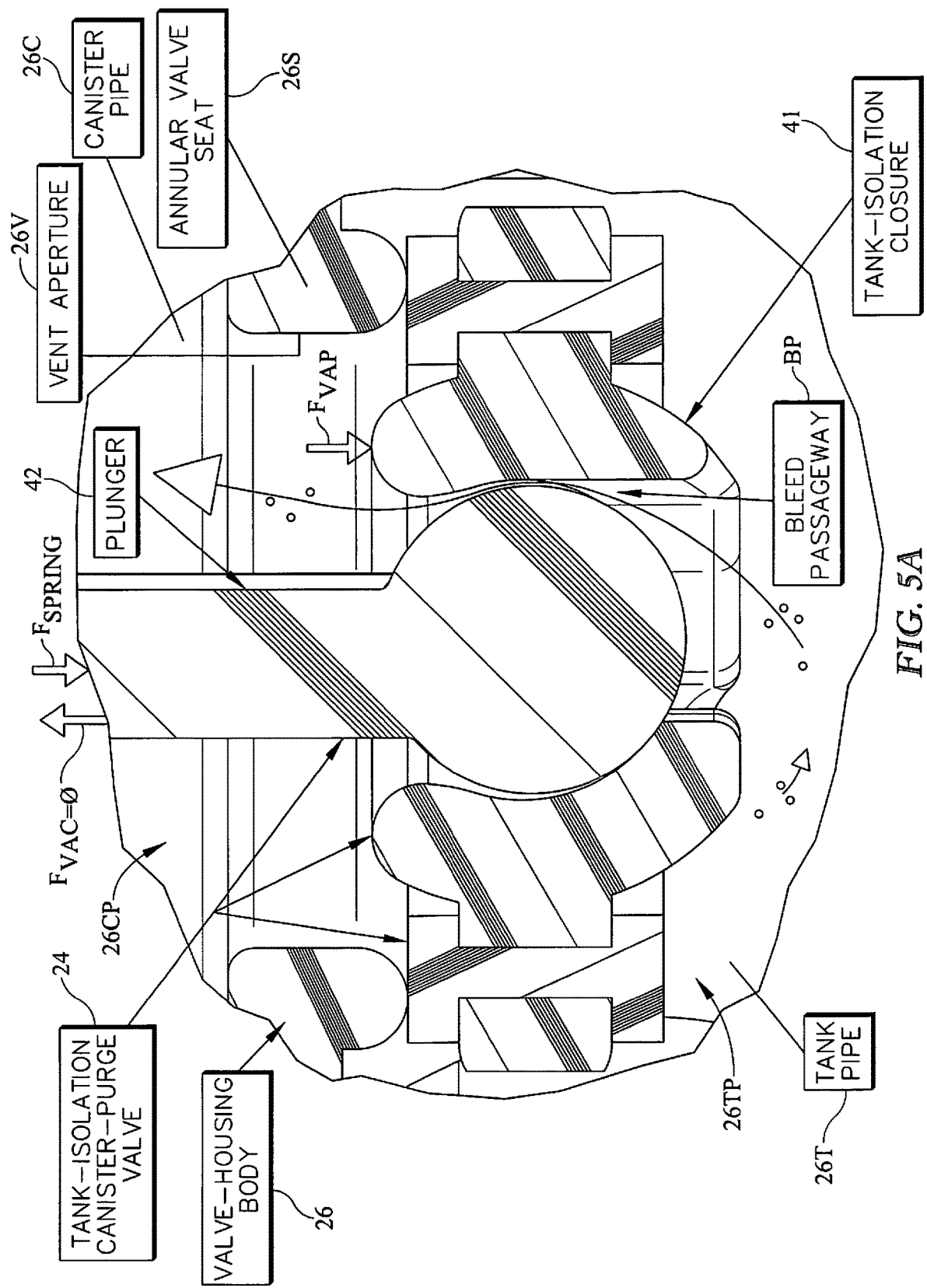
Figure 6:
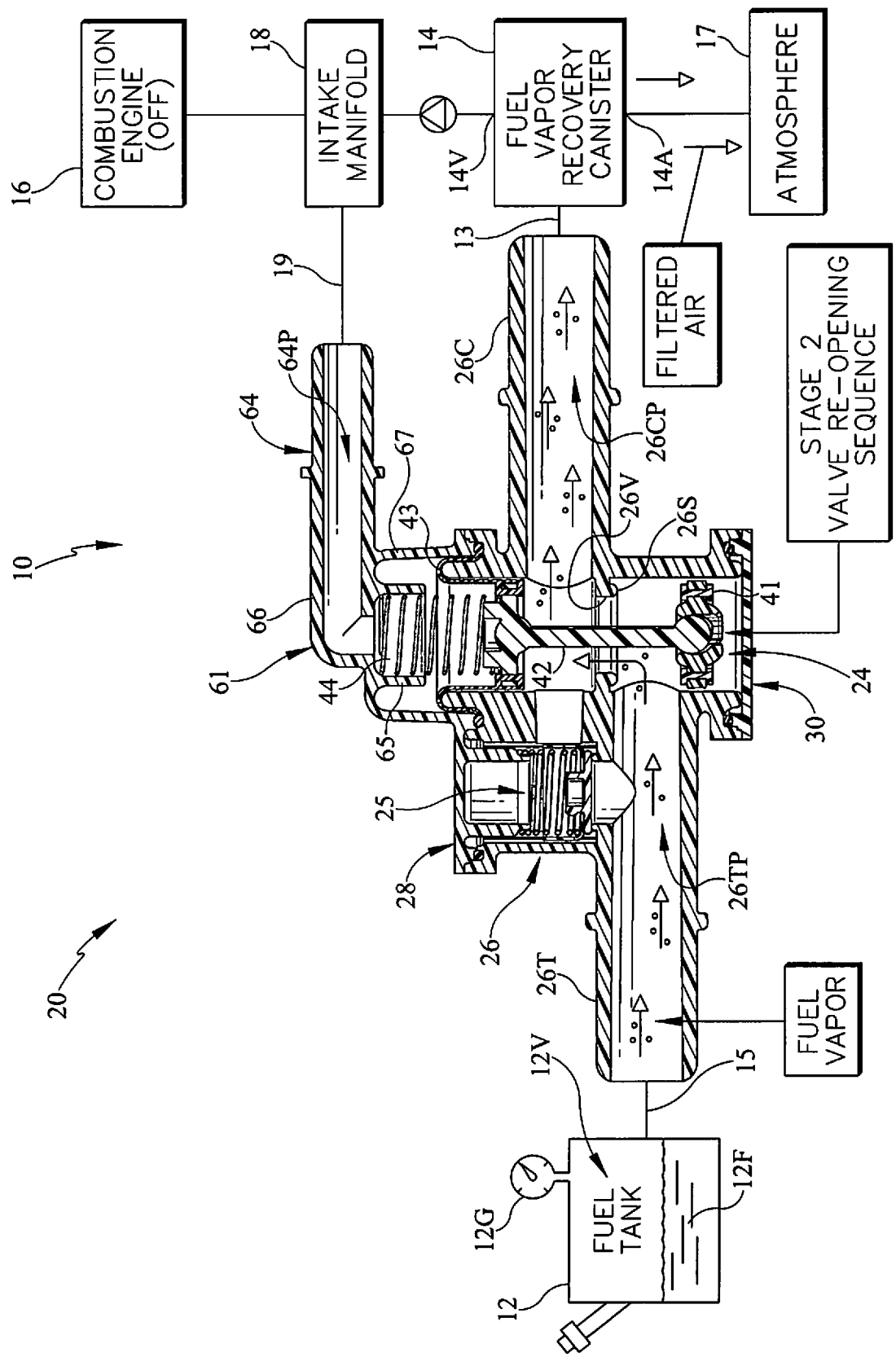
Figure 7:
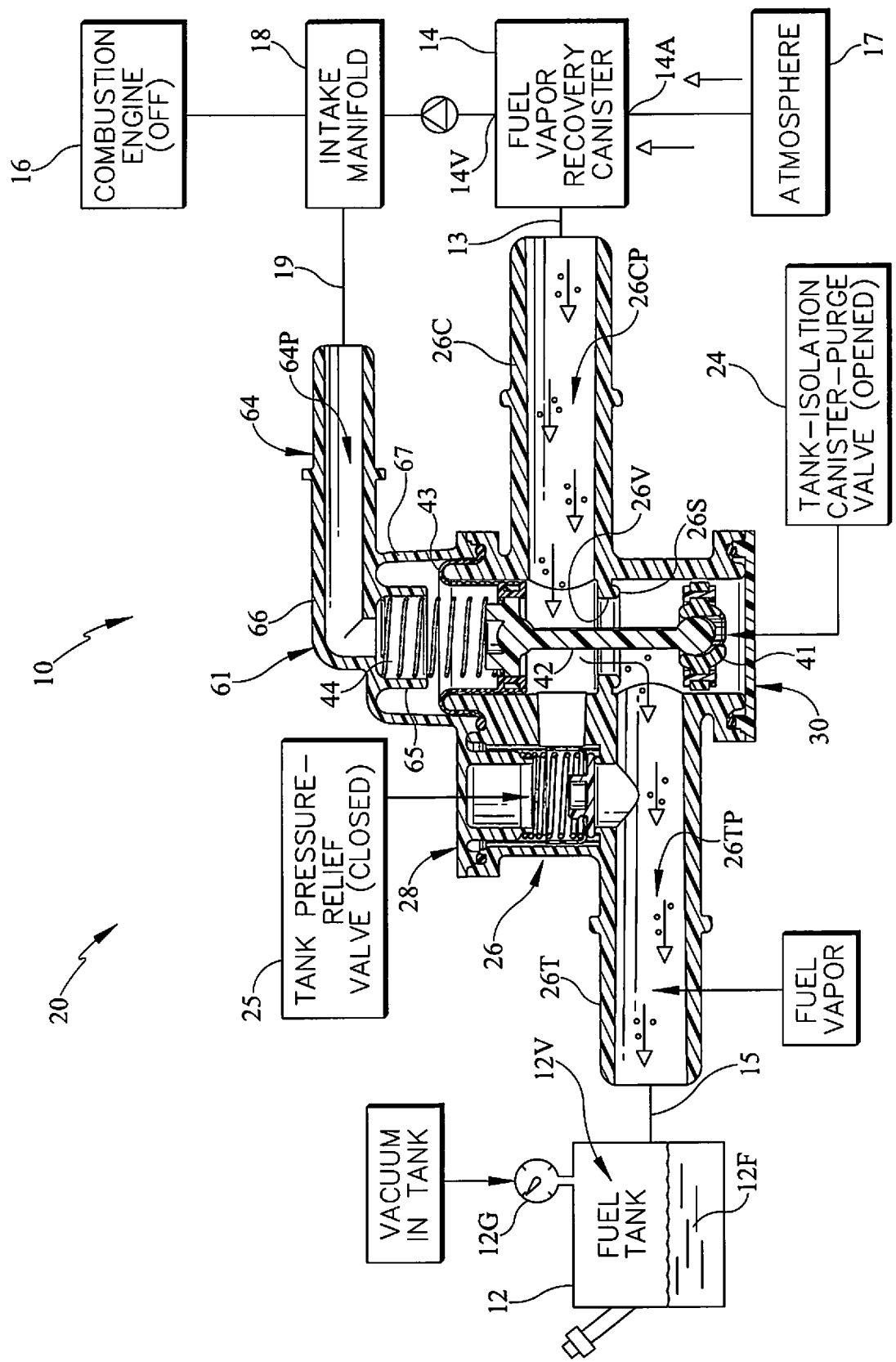
Figure 8:
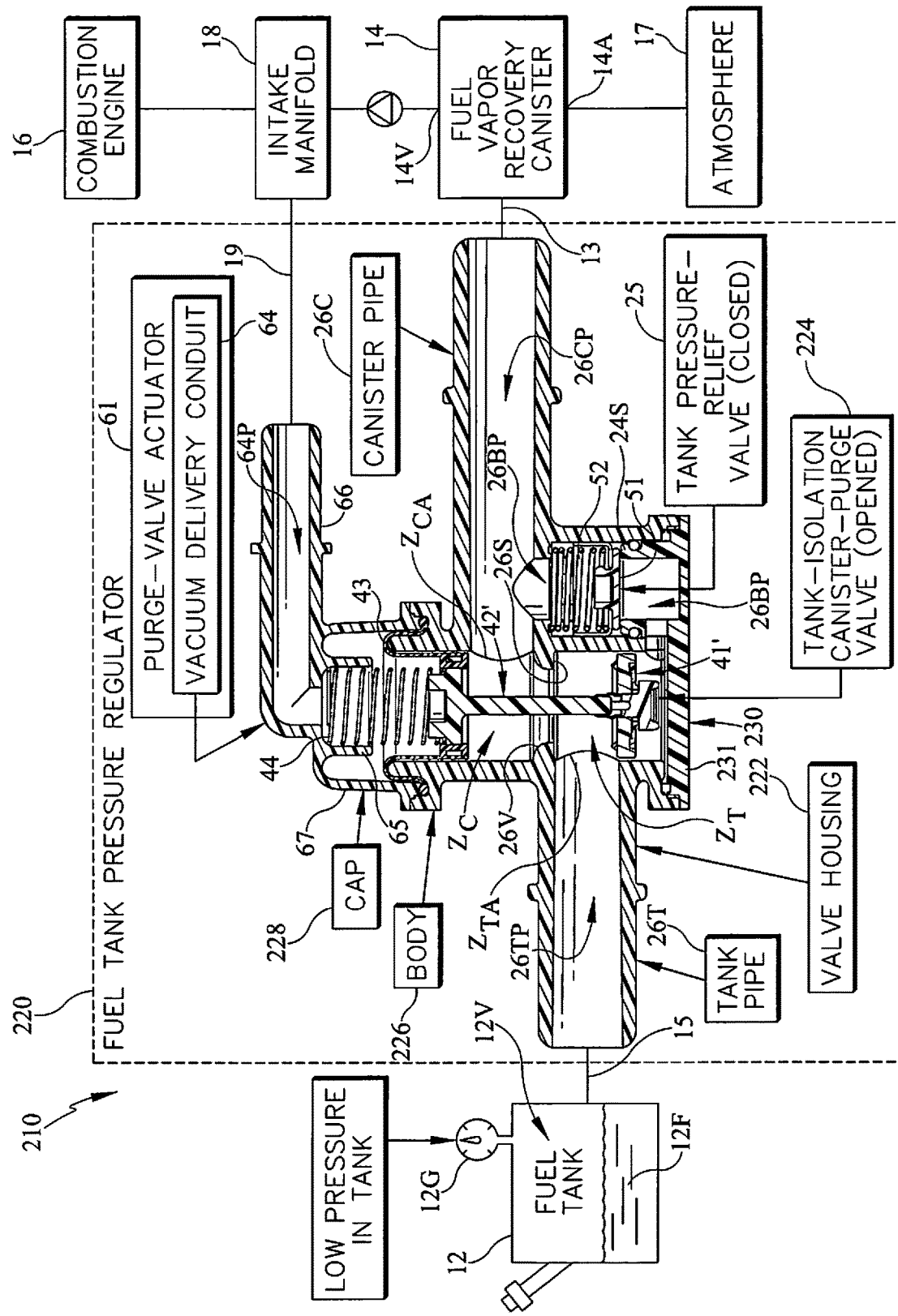
Figure 9:
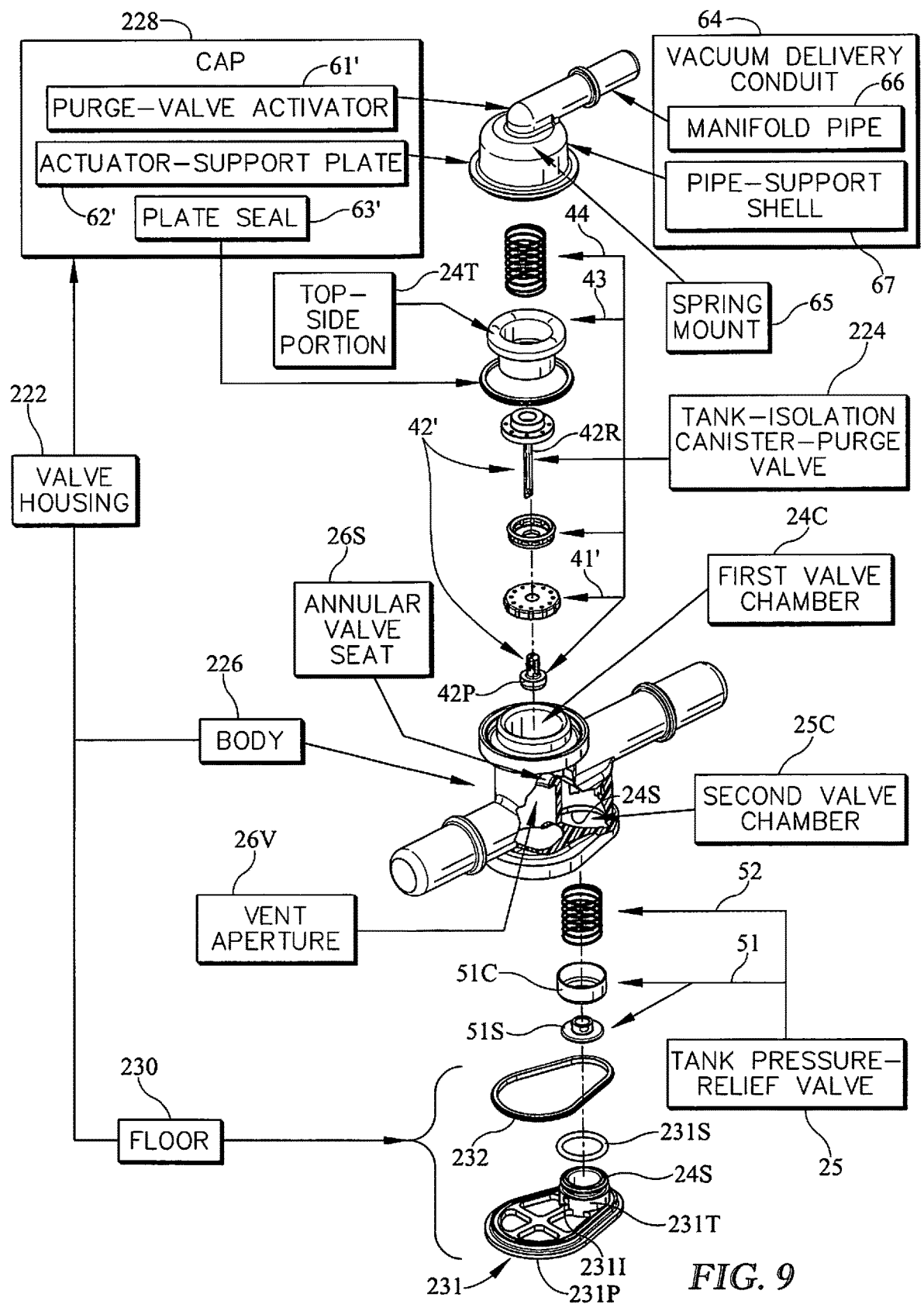
Figure 10:
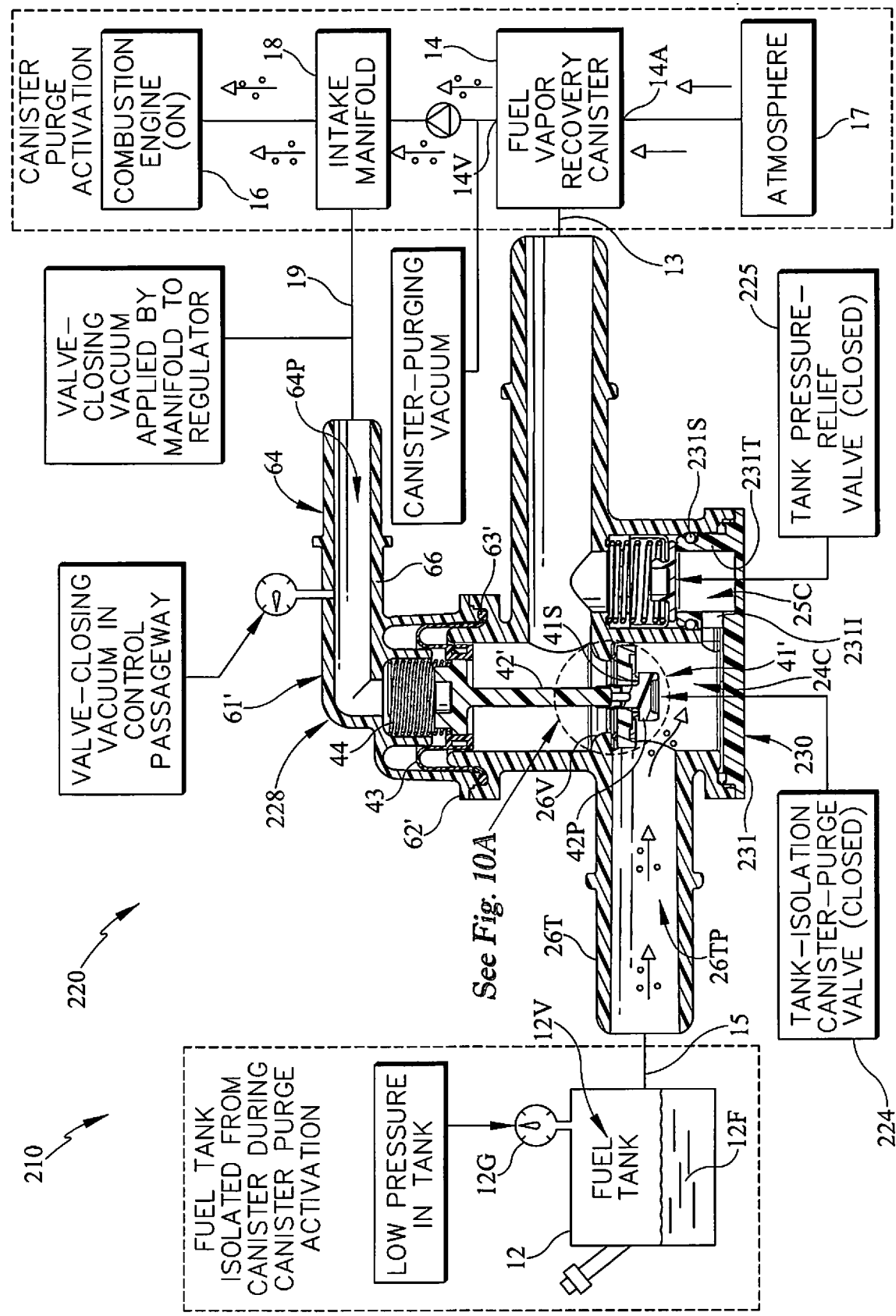
Figure 10A:
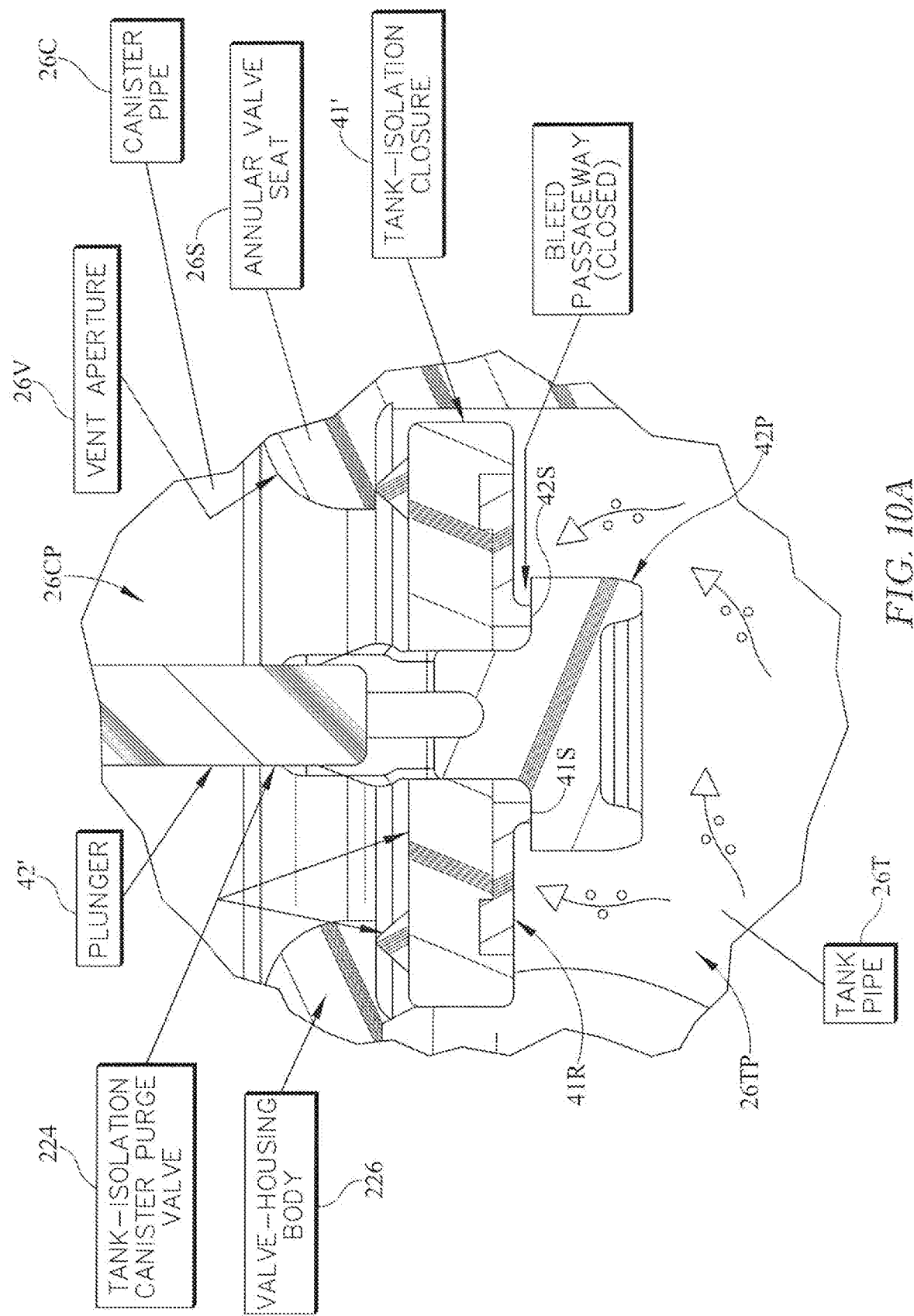
Figure 11:
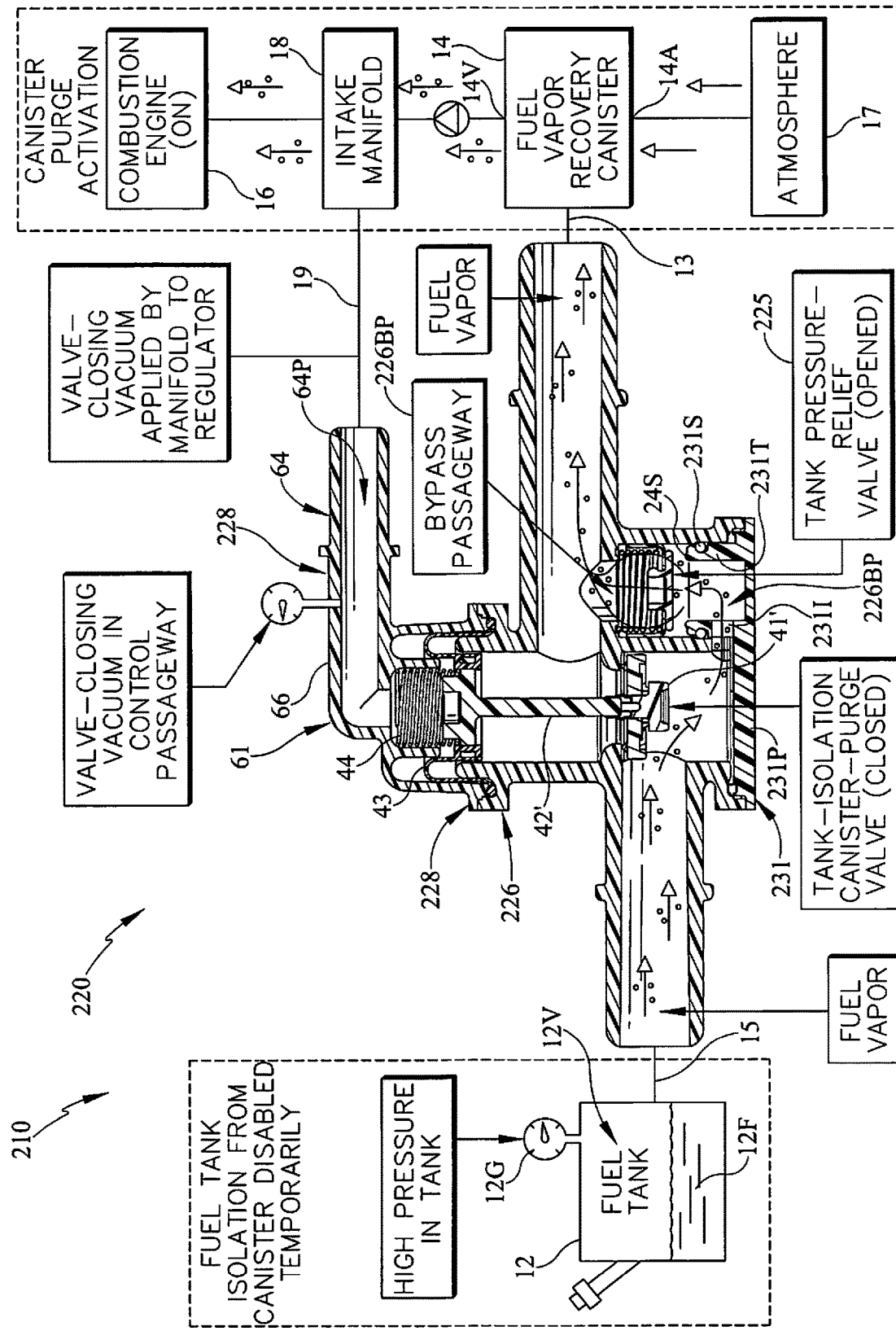
Figure 12:
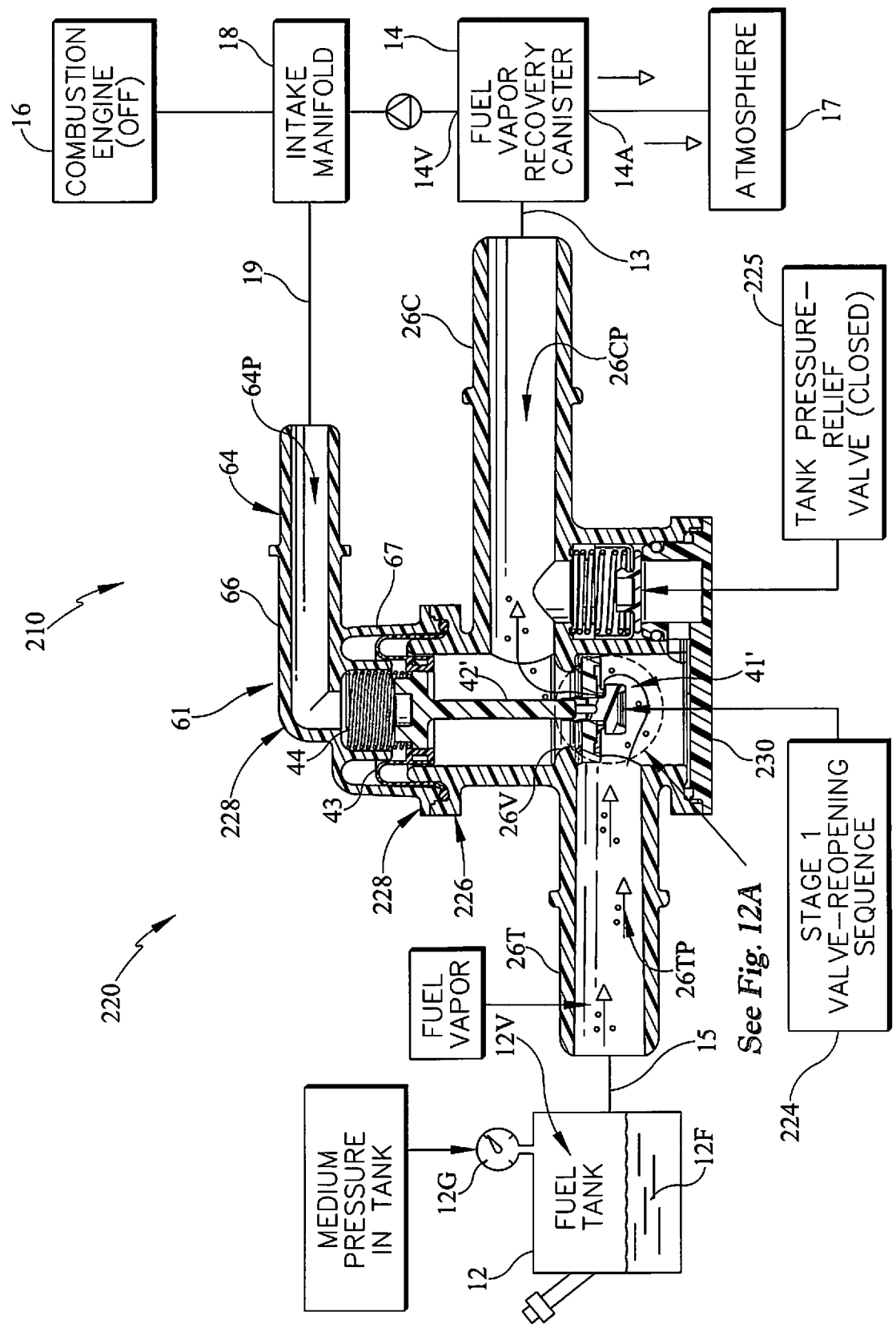
Figure 12A:
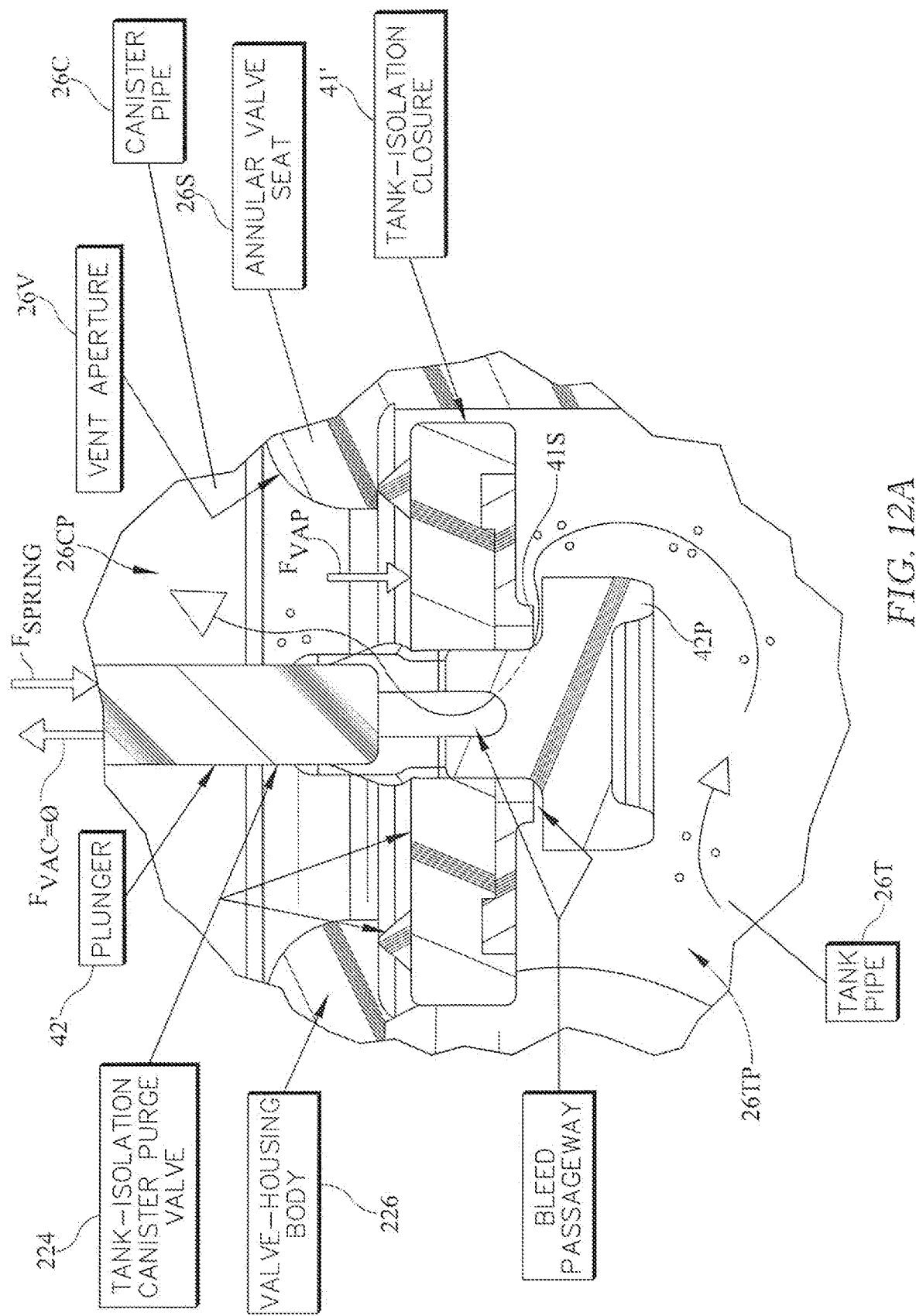
Figure 12B:
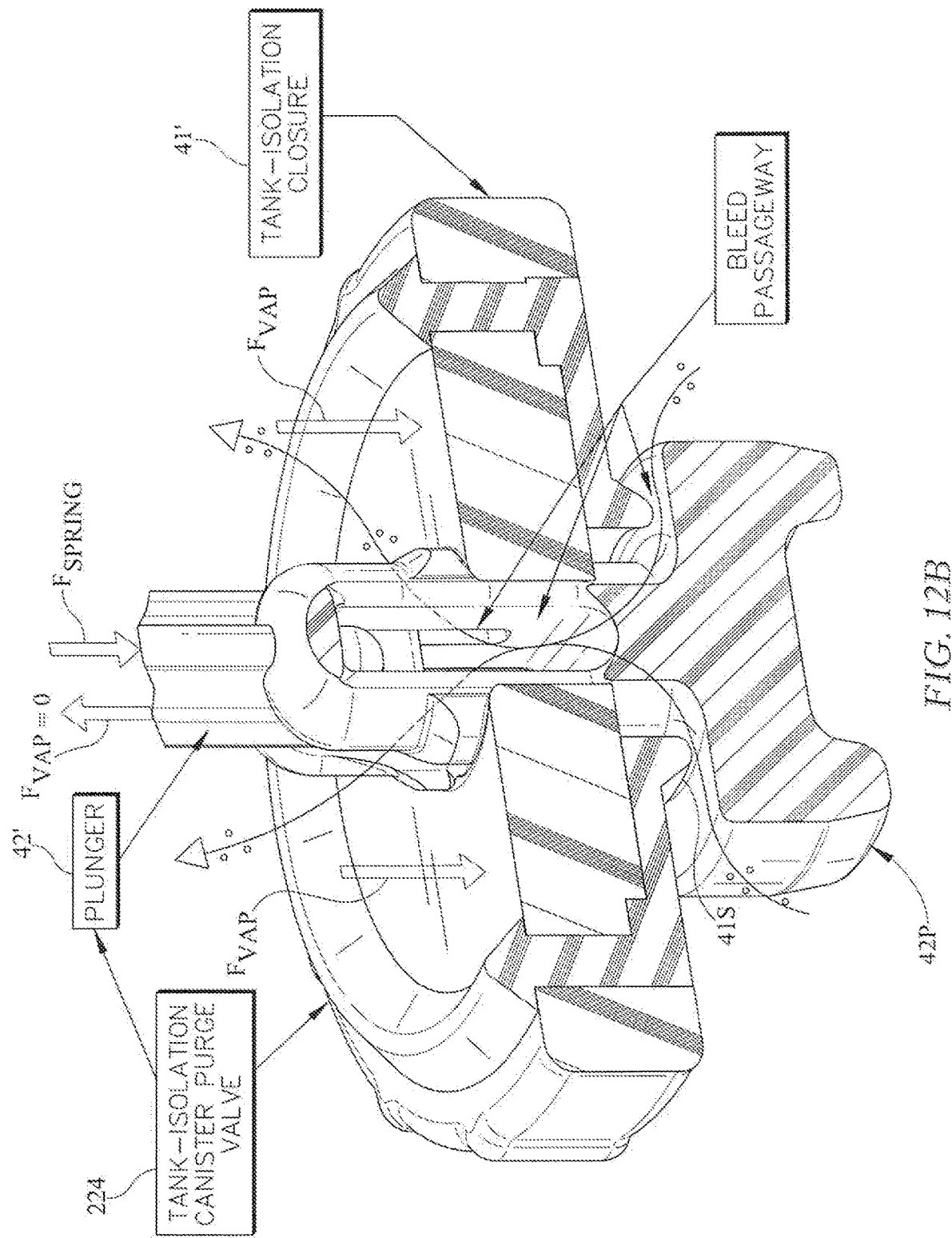
Figure 13:
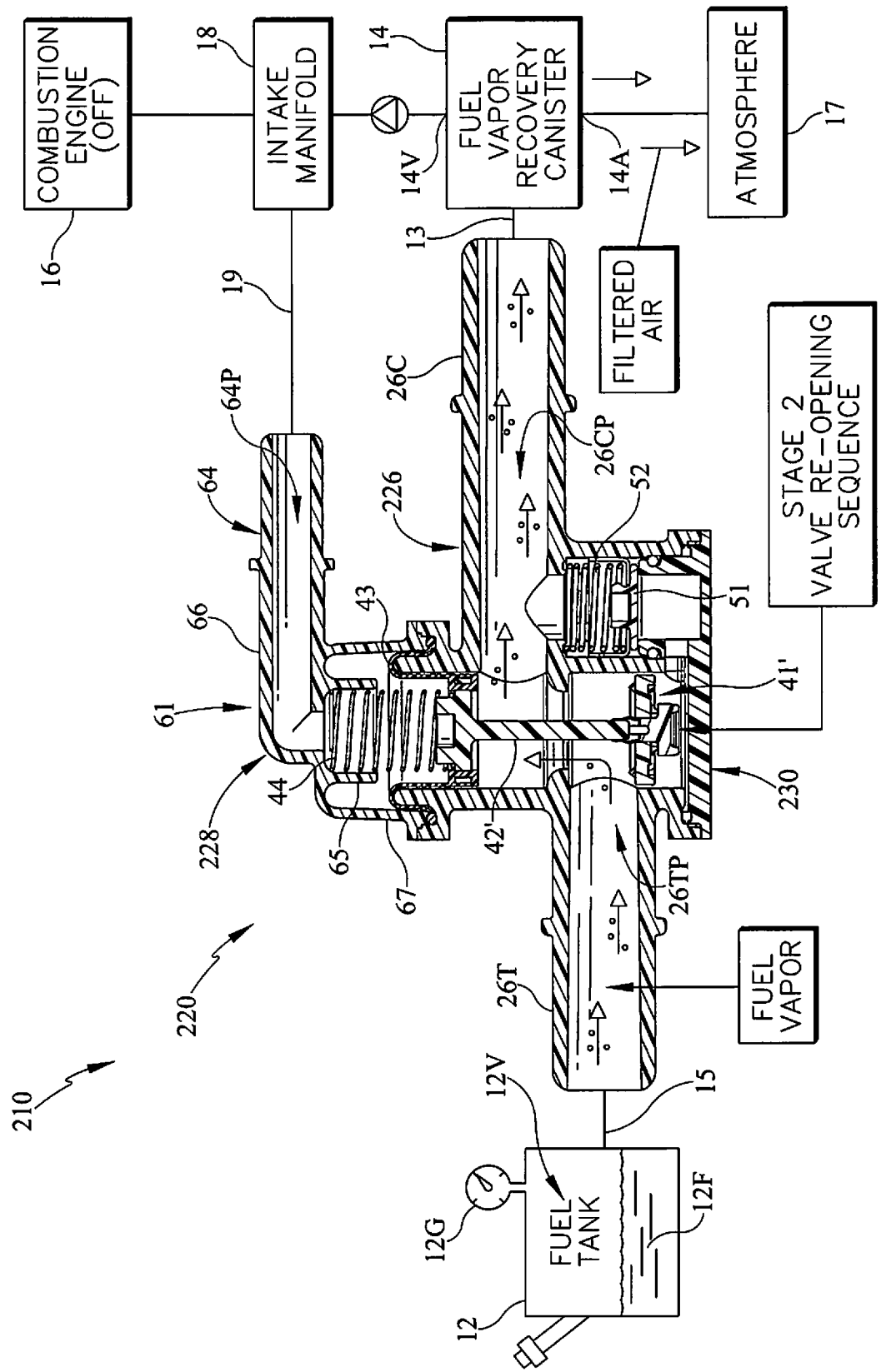
Figure 14:
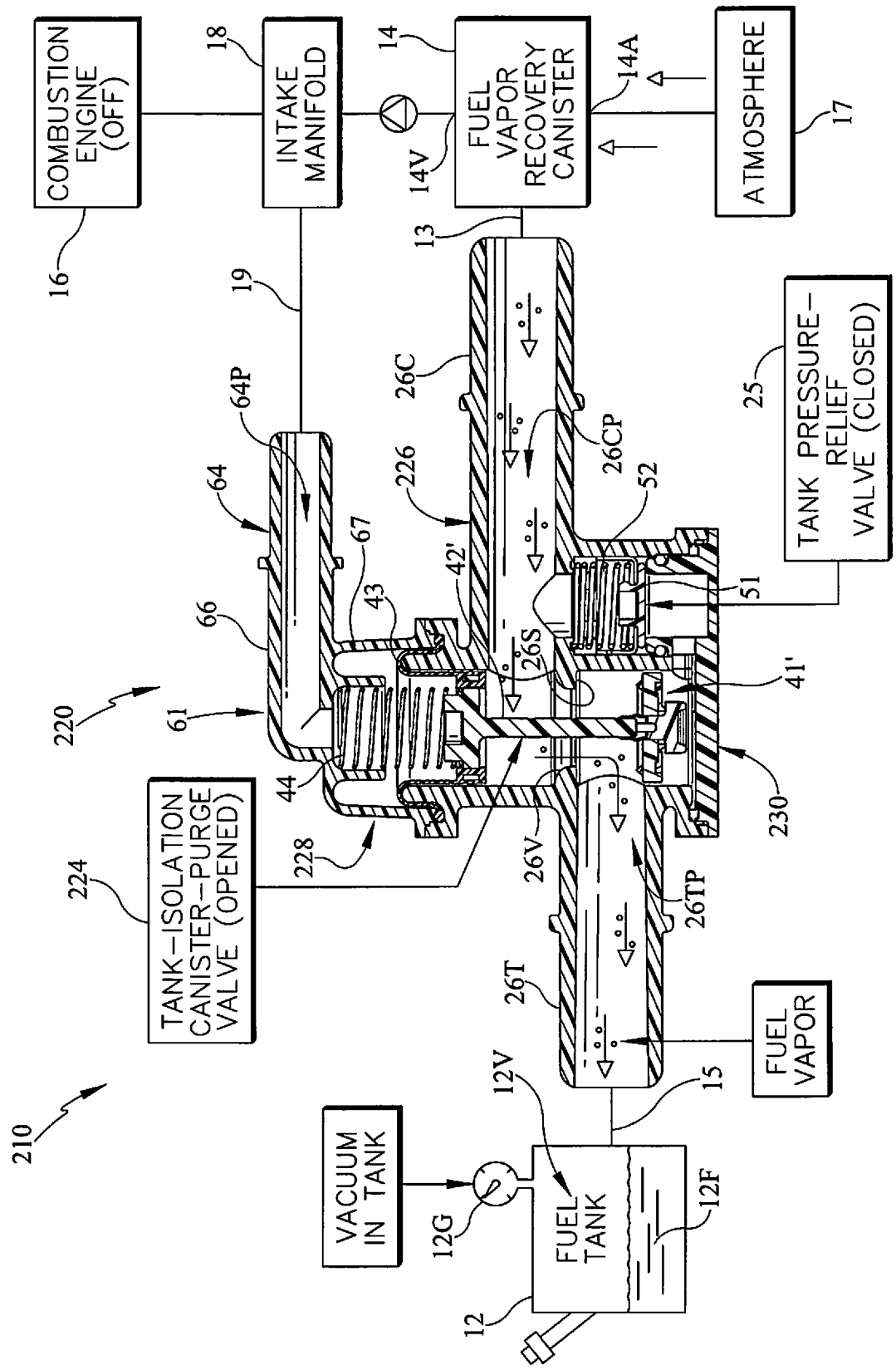

The detailed description particularly refers to the accompanying figures in which:

FIG. 1 is a diagrammatic illustration of a fuel tank venting system comprising a vehicle fuel tank, a fuel vapor recovery canister exposed to the atmosphere, a fuel tank pressure regulator for regulating flow of fuel vapor and atmospheric air between the fuel tank and the fuel vapor recovery canister, and an intake manifold arranged to apply a vacuum to the fuel tank pressure regulator and to the fuel vapor recovery canister when the combustion engine is running as suggested in FIGS. 3 and 4 to maximize efficiency of cleaning of filter media in the fuel vapor recovery canister during a canister purge activation cycle and showing a sectional view of a FIRST EMBODIMENT of the fuel tank pressure regulator including (1) a valve housing formed to include a tank pipe coupled to the fuel tank, a canister pipe coupled to the fuel vapor recovery canister, and a purge-valve actuator including a vacuum delivery conduit coupled to the intake manifold and formed to include a vacuum-transfer passageway, (2) a pneumatic tank-isolation, canister-purge valve that is configured to be moved between a closed position blocking fuel vapor/air flow between the fuel tank and the fuel vapor recovery canister through the tank and canister pipes during the canister purge activation cycle when the engine is running as shown in FIGS. 3 and 4 and an opened position allowing fuel vapor to flow through the fuel tank pressure regulator from the fuel tank to the fuel vapor recovery canister when the engine is off as shown in FIGS. 1 and 6, and (3) a pneumatic tank pressure-relief valve that is normally closed as shown in FIGS. 1, 3, and 5-7 but is opened when high fuel vapor pressure is detected in the fuel tank to bypass the closed tank-isolation, canister-purge valve to vent such high fuel vapor pressure from the fuel tank to the fuel vapor recovery canister through the tank and canister pipes as shown in FIG. 4;

FIG. 2 is an exploded perspective assembly view of the components included in the fuel tank pressure regulator of FIG. 1 showing that the valve housing includes a body formed to include the tank and canister pipes and broken away to show a vent aperture that is formed in an annular valve seat to interconnect passageways formed in the tank and canister pipes in fluid communication, a first valve chamber associated with the pneumatic tank-isolation, canister-purge valve, and a shorter second valve chamber associated with the tank pressure-relief valve, a round floor including a disk configured to mate with a bottom portion of the valve-housing body to close a bottom aperture opening upwardly into the first valve chamber as suggested in FIG. 1 and a circular disk seal above the disk, a cap configured to include the purge-valve actuator, an actuator-support plate, and a figure 8-shaped plate seal configured to mate with a top portion of the valve housing to close top apertures opening downwardly into the first and second valve chambers, a tank-isolation, canister-purge valve sized to fit in the first valve chamber and comprising, in sequence, from top to bottom, a coil spring, a flexible diaphragm associated with one ring of the figure-8-shaped plate seal, a tank-isolation closure under the flexible diaphragm, and a plunger adapted to interconnect the flexible diaphragm and the tank-isolation closure as shown in FIG. 1, and a tank pressure-relief valve sized to fit in the second valve chamber;

FIG. 3 is a view similar to FIG. 1 showing that the pneumatic tank-isolation, canister-purge valve is closed when the combustion engine is running because the intake manifold has applied a valve-closing vacuum to a top side of the flexible diaphragm included in the tank-isolation, canister-purge valve located in the first valve chamber of the valve-housing body via a vacuum-transfer passageway formed in the vacuum delivery conduit of the purge-valve actuator to generate a force ($F_{VAC}$) that acts to pull the plunger upwardly in the first valve chamber to compress the coiled spring and move the tank-isolation closure upwardly to engage the underside of an annular valve seat included in the valve-housing body to close a vent aperture formed in the interior annular valve seat so as to block flow of pressurized fuel vapor from the fuel tank and tank pipe into the canister pipe and the fuel vapor recovery canister so that the intake manifold is active to apply a canister-purging vacuum to purge the fuel vapor recovery canister without drawing any additional fuel vapor from the fuel tank into the fuel vapor recovery canister during a canister purge activation cycle;

FIG. 3A is an enlarged view of the circled region shown in FIG. 3, and shows that a fluid-tight seal is established between a ball provided at a lower end of the plunger and a curved ball-engaging surface included in the tank-isolation closure and arranged to surround a medial portion of the ball so that no pressurized fuel vapor extant in the fuel tank and the tank pipe is able to flow past the tank-isolation closure through the vent aperture formed in the annular valve seat into the canister pipe and then toward the fuel vapor recovery canister during the canister purge activation cycle;

FIG. 4 is a view similar to FIG. 3 showing that the tank-isolation, canister-purge valve is closed when engine is running during the canister purge activation cycle but showing that high fuel vapor pressure in the fuel tank and tank pipe is sufficient to open the normally closed tank-pressure relief valve located in the second valve chamber of the valve-housing body so that pressurized fuel vapor can flow temporarily from the tank pipe to the canister pipe through an opened bypass passageway provided in the second and first valve chambers while the tank-isolation, canister-purge valve remains closed until the fuel vapor pressure in the tank is lowered to an acceptable predetermined level as suggested in FIGS. 3 and 5;

FIG. 5 is a view similar to FIG. 4 and shows a first stage of a two-stage sequence to re-open the tank-isolation, canister-purge valve after the combustion engine has been turned off so as to allow free flow of pressurized fuel vapor from the fuel tank to the fuel vapor recovery canister to resume at the completion of a second stage re-opening sequence as shown in FIG. 6;

FIG. 5A is an enlarged view of the circled region shown in FIG. 5 and shows that a small amount of pressurized fuel vapor is able to bleed or otherwise flow from the tank pipe into the canister pipe through a small bleed passageway provided between opposing surfaces of the plunger ball and the curved ball-engaging surface of the tank-installation closure so as to increase the pressure of fuel vapor extant above the plunger ball in the first valve chamber over time to apply a downward force ($F_{VAP}$) generated by that fuel vapor pressure and suggesting that the bleed passageway is opened because, in part, a lifting force ($F_{VAC}$) generated by a vacuum extant in the vacuum transfer passageway of the vacuum delivery conduit has dissipated while the downward pushing force ($F_{SPRING}$) generated by the coiled spring remains active;

FIG. 6 is a view similar to FIG. 5 and shows a subsequent second stage of a two-stage sequence to re-open the tank-isolation, canister-purge valve after the combustion engine has been turned off so that pressurized fuel vapor once again is able to flow freely from the fuel tank to the fuel vapor recovery canister through the fuel tank pressure regulator to cause hydrocarbons entrained in the pressurized fuel vapor to be adsorbed on a filter media stored in the canister and to discharge filtered air from the canister to the atmosphere;

FIG. 7 is a view similar to FIG. 5 during an environmental condition (e.g., fuel tank cool down during night time) in which a vacuum has developed in the vapor space provided in the fuel tank while the combustion engine is off and showing that such vacuum is sufficient to draw air from the atmosphere into the fuel vapor recovery canister and re-entrain hydrocarbons that had been adsorbed on the filter media in the canister and to draw that fuel vapor through the canister and tank pipes in the fuel tank pressure regulator into the vapor space provided in the fuel tank;

FIG. 8 is a diagrammatic illustration of a fuel tank venting system comprising a vehicle fuel tank, a fuel vapor recovery canister exposed to the atmosphere, a fuel tank pressure regulator for regulating flow of fuel vapor and atmospheric air between the fuel tank and the fuel vapor recovery canister, and an intake manifold arranged to apply a vacuum to the fuel tank pressure regulator and to the fuel vapor recovery canister when the combustion engine is running as suggested in FIGS. 10 and 11 to maximize efficiency of hydrocarbon cleaning of filter media in the fuel vapor recovery canister during a canister purge activation cycle and showing a sectional view of a SECOND EMBODIMENT of the fuel tank pressure regulator including (1) a valve housing formed to include a tank pipe coupled to the fuel tank, a canister pipe coupled to the fuel vapor recovery canister, and a purge-valve actuator including a vacuum delivery conduit coupled to the intake manifold and formed to include a vacuum-transfer passageway, (2) a tank-isolation, canister-purge valve that is configured to be moved between a closed position blocking fuel vapor/air flow between the fuel tank and the fuel vapor recovery canister through the tank and canister pipes during the canister purge activation cycle when the engine is running as shown in FIGS. 10 and 11 and an opened position allowing fuel vapor to flow through the fuel tank pressure regulator from the fuel tank to the fuel vapor recovery canister when the engine is off as shown in FIGS. 8 and 13, and (3) a re-located tank pressure-relief valve that is normally closed as shown in FIGS. 8, 10, and 12-14 but is opened when high fuel vapor pressure is detected in the fuel tank to bypass the closed tank-isolation, canister-purge valve to vent such high fuel vapor pressure from the fuel tank to the fuel vapor recovery canister through the tank and canister pipes as shown in FIG. 11;

FIG. 9 is an exploded perspective assembly view of the components included in the fuel tank pressure regulator of FIG. 8 showing that the valve housing includes a body formed to include the tank and canister pipes and broken away to show a vent aperture that is formed in an annular valve seat to interconnect passageways formed in the tank and canister pipes in fluid communication, a first valve chamber associated with the tank-isolation, canister-purge valve, and a shorter second valve chamber associated with the tank pressure-relief valve, an oblong floor including a disk configured to mate with a bottom portion of the valve-housing body to close a bottom aperture opening upwardly into the first valve chamber as suggested in FIG. 8 and a circular disk seal above the disk, a cap configured to include the purge-valve actuator, an actuator-support plate, and a round plate seal configured to mate with a top portion of the valve housing to close a top aperture opening downwardly into the first valve chamber, a tank-isolation, canister-purge valve sized to fit in the first valve chamber and comprising, in sequence, from top to bottom, a coil spring, a flexible diaphragm associated with the round plate seal, a tank-isolation closure under the flexible diaphragm, and a plunger adapted to interconnect the flexible diaphragm and the tank-isolation closure as shown in FIG. 8, and a tank pressure-relief valve sized to fit in the second valve chamber;

FIG. 10 is a view similar to FIG. 8 showing that the tank-isolation, canister-purge valve is closed when the combustion engine is running because the intake manifold has applied a valve-closing vacuum to a top side of the flexible diaphragm included in the tank-isolation, canister-purge valve located in the first valve chamber of the valve-housing body via a vacuum-transfer passageway formed in the vacuum delivery conduit manifold pipe of the purge-valve actuator to generate a force ($F_{VAC}$) that acts to pull the plunger upwardly in the first valve chamber to compress the coiled spring and move the tank-isolation closure upwardly to engage the underside of an annular valve seat included in the valve-housing body to close a vent aperture formed in the interior annular valve seat so as to block flow of pressurized fuel vapor from the fuel tank and tank pipe into the canister pipe and the fuel vapor recovery canister so that the intake manifold is active to apply a canister-purging vacuum to purge the fuel vapor recovery canister without drawing any additional fuel vapor from the fuel tank into the fuel vapor recovery canister during a canister purge activation cycle;

FIG. 10A is an enlarged view of the circled region shown in FIG. 10, and shows that a fluid-tight seal is established between a pad provided at a lower end of the plunger and a circular lower rim of a seal ring included in the tank-isolation closure so that no pressurized fuel vapor extant in the fuel tank and the tank pipe is able to flow past the tank-isolation closure through the vent aperture formed in the annular valve seat into the canister pipe and then toward the fuel vapor recovery canister during the canister purge activation cycle;

FIG. 11 is a view similar to FIG. 10 showing that the tank-isolation, canister-purge valve is closed when engine is running during the canister purge activation cycle but showing that high fuel vapor pressure in the fuel tank and tank pipe is sufficient to open the normally closed tank-pressure relief valve located in the second valve chamber of the valve-housing body so that pressurized fuel vapor can flow temporarily from the tank pipe to the canister pipe through an opened bypass passageway provided in the first and second valve chambers while the tank-isolation, canister-purge valve remains closed until the fuel vapor pressure in the tank is lowered to an acceptable predetermined level as suggested in FIGS. 10 and 12;

FIG. 12 is a view similar to FIG. 11 and shows a first stage of a two-stage sequence to re-open the tank-isolation, canister-purge valve after the combustion engine has been turned off so as to allow free flow of pressurized fuel vapor from the fuel tank to the fuel vapor recovery canister to resume at the completion of a second stage re-opening sequence as shown in FIG. 13;

FIG. 12A is an enlarged view of the circled region shown in FIG. 12 and shows that a small amount of pressurized fuel vapor is able to bleed or otherwise flow from the tank pipe into the canister pipe through a small bleed passageway provided between opposing surfaces of the plunger pad and the overlying circular lower rim of the tank-installation closure so as to increase the pressure of fuel vapor extant above the plunger ball in the first valve chamber over time;

FIG. 12B is an enlarged perspective view of the tank-isolation closure and movable plunger shown in FIG. 12A with portions broken away to show the opened bleed passageway;

FIG. 13 is a view similar to FIG. 12 and shows a subsequent second stage of a two-stage sequence to re-open the tank-isolation, canister-purge valve after the combustion engine has been turned off so that pressurized fuel vapor once again is able to flow freely from the fuel tank to the fuel vapor recovery canister through the fuel tank pressure regulator to cause fuel droplets entrained in the pressurized fuel vapor to be adsorbed on a filter media stored in the canister and to discharge filtered air from the canister to the atmosphere; and FIG. 14 is a view similar to FIG. 12 during an environmental condition (e.g., fuel tank cool down during night time) in which a vacuum has developed in the vapor space provided in the fuel tank while the combustion engine is off and showing that such vacuum is sufficient to draw air from the atmosphere into the fuel vapor recovery canister and re-entrain fuel droplets that had been adsorbed on the filter media in the canister and to draw that fuel vapor through the canister and tank pipes in the fuel tank pressure regulator into the vapor space provided in the fuel tank.

DETAILED DESCRIPTION

A tank venting system 10 in accordance with a first embodiment of the present disclosure is provided to control flow of air and fuel vapor between a fuel tank 12 and an emission control system that includes a fuel vapor recovery canister 14 as suggested in FIG. 1 and shown, for example, in FIGS. 1-7. System 10 is used on board a vehicle (not shown) including an engine 16 and an intake manifold 18 coupled to engine 16 and canister 14. A tank venting system 210 in accordance with a second embodiment of the present disclosure is shown, for example, in FIGS. 8-14.

Tank venting system 10 includes a pneumatic fuel tank pressure regulator 20 that is coupled to the fuel vapor recovery canister 14 via a canister conduit 13 and to fuel tank 12 via a tank conduit 15 as suggested in FIG. 1. Fuel vapor recovery canister 14 has an atmospheric port 14A exposed to the atmosphere 17 and a vacuum port 14V exposed to negative pressure (e.g. vacuum) generated by engine 16 and applied by intake manifold 18. A pressure gauge 12G is coupled to fuel tank 12 as shown in FIG. 1 to determine fuel vapor pressure extant in a vapor space 12V provided above liquid fuel 12F in an interior region of fuel tank 12.

Fuel vapor recovery canister 14 is used to capture and store hydrocarbons contained in fuel vapor discharged from fuel tank 12 through fuel tank pressure regulator 20. Canister 14 may be a carbon canister or other suitable fuel vapor treatment device. Charcoal or other suitable filter media is located inside canister 14 and arranged to intercept fluid (e.g. fuel vapor and atmospheric air) flowing through canister 14. Hydrocarbons are adsorbed on the filter media provided in canister 14 as fuel vapor flows through such filter media.

Canister 14 is cleaned during a canister purge activation cycle as shown, for example, in FIG. 3. When engine 16 is running, a canister-purging vacuum generated in engine 16 is applied by intake manifold 18 to vacuum port 14V of fuel vapor recovery canister 14 to draw atmospheric air 17 into canister 14 through atmospheric port 14A and cause hydrocarbons adsorbed on the filter media in canister 14 to be re-entrained in that flow of atmospheric air 17 to create a stream of fuel vapor that is discharged from fuel vapor recovery canister 14 through vacuum port 14V. The discharged fuel vapor stream flows through intake manifold 18 into engine 16 to burn the hydrocarbons entrained in that fuel vapor stream.

Fuel tank pressure regulator 20 includes a valve housing 22, a pneumatic tank-isolation canister-purge valve 24, and a pneumatic tank pressure-relief valve 25 as suggested in FIGS. 1 and 2. Fuel vapor flow through valve housing 22 between canister and tank conduits 13, 15 is regulated by canister-purge valve 24 and pressure-relief valve 25 in response to different operational and environmental conditions applied to tank venting system 10.

Tank-isolation, canister-purge valve 24 regulates fuel vapor flow along a main flow path 26TP, 26V, 26CP through valve housing 22 to conduct fuel vapor between the canister conduit 13 that is linked to fuel vapor recovery canister 14 and the tank conduit 15 that is linked to fuel tank 12. Tank pressure-relief valve 25 regulates fuel vapor flow through a bypass passageway 26BP that is formed in valve housing 22 to bypass a closed tank-isolation, canister-purge valve 24 to allow flow of high-pressure fuel vapor from fuel tank 12 through valve housing 22 to fuel vapor recovery canister 14 as suggested in FIG. 4 to relieve excess pressure in fuel tank 12 even though fuel vapor flow along the main flow path through valve housing 22 is blocked by the closed tank-isolation, canister-purge valve 24. As shown in FIG. 1, tank pressure-relief valve 25 is located on the tank-side of fuel tank pressure regulator 20.

Tank-isolation, canister-purge valve 24 is normally retained in an opened position to allow a free flow of fuel vapor from fuel tank 12 to fuel vapor recovery canister 14 through valve housing 22 as shown in FIGS. 1 and 6. But tank-isolation, canister-purge valve 24 is closed automatically during each canister purge activation cycle as suggested in FIG. 3 by exposure to a valve-closing vacuum generated in engine 16 and applied by intake manifold 18 to the tank-isolation, canister-purge valve 24 via a control vacuum-transfer passageway 64P formed in a vacuum delivery conduit 64 that is included in the pneumatic fuel tank pressure regulator 20 as shown, for example, in FIGS. 1-3. During such a canister purge activation cycle, fuel tank pressure regulator 20 does not use any vacuum generated by engine 16 to pull fuel vapor from fuel tank 12 to fuel vapor recovery canister 14 through valve housing 22 of fuel tank pressure regulator 20 because the tank-isolation canister-purge valve 24 is closed. Instead, most of that engine vacuum is used to cleanse fuel vapor recovery canister 14 during a canister purge activation cycle and only some of that vacuum (e.g. the valve-closing vacuum in vacuum delivery conduit 64) is used to activate and close tank-isolation canister-purge valve 24 as suggested in FIG. 3 to block flow of fuel vapor from fuel tank 12 to fuel vapor recovery canister 14 through valve housing 22. Fuel tank pressure regulator 20 is configured to manage the flow of fuel vapor through valve housing 22 pneumatically in accordance with the present disclosure without an electronic control and to maximize hydrocarbon cleaning of fuel vapor recovery canister 14 during a canister purge activation cycle.

Tank pressure-relief valve 25 is normally closed as suggested in FIGS. 1 and 3 to allow flow of fuel vapor through valve housing 22 to be managed by tank-isolation, canister-purge valve 24. However, tank pressure-relief valve 25 is configured to open automatically as shown in FIG. 4 in response to excessive fuel vapor pressure extant in vapor space 12V of fuel tank 12 when tank-isolation, canister-purge valve 24 is closed to allow such highly pressurized fuel vapor to exit fuel tank 12 and bypass the closed canister-purge valve 24 and flow to fuel vapor recovery canister 14 to reduce the pressure inside fuel tank 12 and vent excess tank pressure through valve housing 22 using a bypass passageway 26BP to fuel vapor recovery canister 14.

Valve housing 22 of fuel tank pressure regulator 20 incudes a body 26, a cap 28 coupled to an upper portion of body 26, and a floor 30 coupled to a lower end of body 26 as suggested in FIGS. 1 and 2. Valve-housing body 26 includes a tank pipe 26T formed to include a tank passageway 26TP coupled in fluid communication to tank conduit 15, a canister pipe 26C formed to include a canister passageway 26CP coupled in fluid communication to canister conduit 13, and an interior annular valve seat 26S formed to include a vent aperture 26V.

Valve-housing body 26 is also formed to include a first valve chamber 24C sized to received tank-isolation, canister-purge valve 24 and a second valve chamber 25C sized to receive tank pressure-relief valve 25 as suggested in FIGS. 1 and 2. Portions of tank passageway 26TP and canister passageway 26CP cooperate with vent aperture 26V to define first valve chamber 24C as suggested in FIG. 1. Vent aperture 26V opens into each of tank and canister passageways 26TP, 26CP to connect those tank and canister passageways 26TP, 26CP in fluid communication as long as vent aperture 26V remains open (i.e. unclosed by tank-isolation, canister-purge valve 24).

Tank-isolation, canister-purge valve 24 normally assumes an opened positon in first valve chamber 24C of valve-housing body 26 to allow flow of fuel vapor between tank and canister passageways 26TP, 26CP when engine 16 is not running as suggested, for example, in FIGS. 1, 6, and 7. However, when engine 16 is running and a canister purge cycle is activated to cleanse the filter media in fuel vapor recovery canister 14 as suggested, for example, in FIG. 3, a valve-closing vacuum is applied by intake manifold 18 to control vacuum-transfer passageway 64P formed in vacuum delivery conduit 64 so that the valve-closing vacuum is applied to the tank-isolation, canister-purge valve 24 to cause valve 24 to move in first valve chamber 24C of valve-housing body 26 relative to valve housing 22 from the opened position shown in FIG. 1 in which vent aperture 26V is opened to a closed position shown in FIG. 3 in which vent aperture 26V is closed to block flow of pressurized fuel tank vapor from tank passageway 26TP through vent aperture 26V to canister passageway 26CP, canister conduit 13, and fuel vapor recovery canister 14. As a result, pressurized fuel vapor form fuel tank 12 does not continue to flow along the main flow path through valve housing 22 and canister conduit 13 into fuel vapor recovery canister 14 to deposit more hydrocarbons on the filler media in fuel vapor recovery canister 14 while fuel vapor recovery canister 14 is being cleansed of hydrocarbons during a canister purge activation cycle.

Tank-isolation, canister-purge valve 24 incudes a tank-isolation closure 41, a movable plunger 42, a flexible diaphragm 43, and a plunger-biasing spring 44 as suggested in FIGS. 1 and 2. Tank-isolation closure 41 is located in a tank zone $T_Z$ tank passageway 26TP below vent aperture 26V. The flexible diaphragm 43 is located in canister passageway 26CP above vent aperture 26V. The movable plunger 42 is arranged to interconnect tank-isolation closure 41 and the flexible diaphragm 43 and to extend through vent aperture 26V as shown, for example, in FIG. 1. Plunger-biasing spring 44 is located above tank-isolation closure 41 and arranged to act against a portion of cap 28 normally to urge tank-isolation, canister-purge valve 24 to an opened positon as shown, for example, in FIGS. 1, 6, and 7 to allow fuel vapor to flow between fuel tank 12 and fuel vapor recover canister 14 through the tank passageway 26TP, vent aperture 26V, and canister passageway 26CP formed in valve-housing body 26.

Tank pressure-relief valve 25 includes a closure disk 51 and a disk-biasing spring 52 as shown, for example, in FIGS. 1 and 2. Disk-biasing spring 52 is arranged to act against a portion of cap 28 normally to urge closure disk 51 to engage an opposing annular pressure-relief valve seat 24S included in valve-housing body 26 and associated with second valve chamber 25C to close a bypass passageway 26BP provided in valve-housing body 26 as suggested in FIGS. 1, 3, 6, and 7.

Tank pressure-relief valve 25 normally assumes a closed position in second valve chamber 25C of valve-housing body 26 to block flow of pressurized fuel vapor in tank passageway 26TP around the closed tank-isolation, canister-purge valve 24 via a bypass passageway 26BP. However, when the fuel vapor pressure in the interior region of fuel tank 12 exceeds a predetermined level, pressurized fuel vapor in tank passageway 26TP acts against an exposed underside of closure disk 51 to move the spring-loaded closure disk 51 upwardly in second valve chamber 25C away from the annular pressure-relief valve seat 24S to open bypass passageway 26BP as suggested in FIG. 4 so that pressurized fuel vapor can flow from tank passageway 26TP through bypass passageway 26BP into canister passageway 26CP even though vent aperture 26V remains closed due to engagement of the closed tank-isolation, canister-purge valve 24 with annular valve seat 26S.

Cap 28 of valve housing 22 is configured to be mounted on top of valve-housing body 26 to close separate top openings into the first and second valve chambers 24C, 25C formed in valve-housing body 26 as suggested in FIGS. 1 and 2. Cap 28 includes a purge-valve actuator 61 that is linked in fluid communication to intake manifold 18 by manifold conduit 19, an actuator-support plate 62 that supports purge-valve actuator 61 and mates with valve-housing body 26, and a figure-8-shaped plate seal 63 that is interposed between valve-housing body 26 and actuator-support plate 62 to establish a fluid seal around each of the top openings into the first and second valve chambers 24C, 25C as suggested in FIGS. 1 and 2.

Purge-valve actuator 61 of cap 28 includes a vacuum delivery conduit 64 and a spring mount 65 is coupled to an underside of vacuum delivery conduit 64 as shown in FIG. 1. Spring mount 65 is located in an interior region of vacuum delivery conduit 64 and configured to mate with a free end of the plunger-biasing spring 44 included in tank-isolation, canister-purge valve 24 as suggested in FIGS. 1 and 2.

Vacuum delivery conduit 64 includes a manifold pipe 66 that is adapted to be coupled in fluid communication to manifold conduit 19 to receive a valve-closing vacuum applied by intake manifold 18 and a pipe-support shell 67 that is coupled to actuator-support plate 62 and mated to spring mount 65 as suggested in FIGS. 1-3. Manifold pipe 66 and pipe-support shell 67 of vacuum delivery conduit 64 cooperate to define a control vacuum-transfer passageway 64P through which a valve-closing vacuum generated by engine 16 and applied by intake manifold 18 via manifold conduit 19 is conducted to one end of tank-isolation, canister-purge valve 24 during a canister purge activation cycle to cause tank-isolation, canister-purge valve 24 to move from the opened positon shown in FIG. 1 to the closed position shown in FIG. 3 so as to block flow of pressurized fuel vapor from fuel tank 12 to fuel vapor recovery canister 14 through the tank passageway 26TP, vent aperture 26V, and canister passageway 26CP formed in valve housing 22 of fuel tank pressure regulator 20. Closure of tank-isolation, canister-purge valve 24 is accomplished pneumatically in accordance with the present disclosure without resort to use of electronic valve movers.

Floor 30 of valve housing 22 is configured to be mounted on the bottom of valve-housing body 26 to close a bottom opening into the first valve chamber 24C formed in a valve-housing body 26 as suggested in FIGS. 1 and 2. Floor 30 includes a disk 31 configured to mate with valve-housing body 26 and a circular disk seal 32 that is interposed between valve-housing body 26 and disk 31 to establish a fluid seal around the bottom opening into the first valve chamber 24C as suggested in FIGS. 1 and 2.

As suggested in FIG. 3, tank-isolation, canister-purge valve 24 is closed when engine 16 is running because intake manifold 18 has applied a valve-closing vacuum to a top side of the flexible diaphragm 63 included in tank-isolation, canister-purge valve 24 located in first valve chamber 24 of valve-housing body 26 via a control vacuum-transfer passageway 64P formed in vacuum delivery conduit 64 of purge-valve actuator 61. Application of such a valve-closing vacuum over the exposed area of diaphragm 63 generates a lifting force ($F_{VAC}$) that operates to pull plunger 42 upwardly in first valve chamber 24C to compress the coiled spring 44 and move tank-isolation closure 41 upwardly to engage the underside of an annular valve seat 26S included in valve-housing body 26 to close a vent aperture 26V formed in the annular valve seat 26S. This acts to block flow of pressurized fuel vapor from fuel tank 12 and tank pipe 26T into canister pipe 26C and fuel vapor recovery canister 14 so that intake manifold 18 is active to apply a canister-purging vacuum to purge fuel vapor recovery canister 14 without drawing any additional fuel vapor from fuel tank 12 into fuel vapor recovery canister during a canister purge activation cycle.

A fluid-tight seal is established as shown in FIG. 3A between a ball 42B provided at a lower end of plunger 42 and a curved ball-engaging surface 42S included in tank-isolation closure 41 and arranged to surround a medial portion of the ball 42B. As a result, no pressurized fuel vapor extant in fuel tank 12 and tank pipe 26T is able to flow past tank-isolation closure 41 through vent aperture 26V formed in annular valve seat 26S into canister pipe 26C and then toward fuel vapor recovery canister 14 during the canister purge activation cycle.

Tank-isolation, canister-purge valve 24 is closed when engine 16 is running during the canister purge activation cycle as shown in FIG. 4. High fuel vapor pressure in fuel tank 12 and tank pipe 26T is sufficient to open the normally closed tank-pressure relief valve 25 located in second valve chamber 25C of valve-housing body 26 so that pressurized fuel vapor can flow temporarily from tank pipe 26T to canister pipe 26C through an opened bypass passageway 26BP provided in the second and first valve chambers 25C, 24C while the tank-isolation, canister-purge valve 24 remains closed and until the fuel vapor pressure in fuel tank 12 is lowered to an acceptable predetermined level as suggested in FIGS. 3 and 5.

A first stage of a two-stage sequence to re-open the tank-isolation, canister-purge valve 24 is shown in FIG. 5. This first stage occurs after engine 16 has been turned off so as to allow free flow of pressurized fuel vapor from fuel tank 12 to fuel vapor recovery canister 14 to resume at the completion of a second stage re-opening sequence as shown in FIG. 6. In this first stage, a small amount of pressurized fuel vapor is able to bleed or otherwise flow as shown in FIG. 5A from tank pipe 26T into canister pipe 26C through a small bleed passageway BP provided between opposing surfaces of the plunger ball 42B and the curved ball-engaging surface 41S of tank-isolation closure 41 so as to increase the downward force on closure 41 associated with pressure of fuel vapor ($F_{VAP}$) extant above the plunger ball 42B in first valve chamber 24C over time and suggesting that the bleed passageway BP is opened because, in part, a lifting force ($F_{VAC}$) generated by a vacuum extant in the control vacuum-transfer passageway 64P of vacuum delivery conduit 64 has dissipated while the downward pushing force ($F_{SPRING}$) generated by the coiled spring 44 remains active. As the fuel vapor pressure above plunger ball 42B and a top surface of tank-isolation closure 41 increases, such pressure acts over the exposed area to create a downforce ($F_{VAP}$) that cooperates with the spring force ($F_{SPRING}$) to move tank-isolation, canister-purge valve 24 to an opened position.

A subsequent second stage of a two-stage sequence to re-open the tank-isolation, canister-purge valve 24 is shown in FIG. 6. This second stage occurs after engine 16 has been turned off so that pressurized fuel vapor once again is able to flow freely from fuel tank 12 to fuel vapor recovery canister 14 through fuel tank pressure regulator 30 to cause hydrocarbons entrained in the pressurized fuel vapor to be adsorbed on a filter media stored in canister 14 and to discharge filtered air from canister 14 to the atmosphere 17.

An environmental condition (e.g., fuel tank cool down during night time) in which a vacuum has developed in vapor space 12V provided in fuel tank 12 while engine 16 is off is shown in FIG. 7. Such vacuum is sufficient to draw air from atmosphere 17 into fuel vapor recovery canister 14 and re-entrain hydrocarbons that had been adsorbed on the filter media in canister 14 and to draw that fuel vapor through canister and tank pipes 26C, 26T in fuel tank pressure regulator 20 into the vapor space 12V provided in fuel tank 12.

Valve housing 22 includes an interior annular valve seat 26S formed to include a vent aperture 26V and a purge-valve actuator 61 including a vacuum delivery conduit 64 as suggested in FIG. 1. Vacuum delivery conduit 64 is formed to include a vacuum-transfer passageway 64P adapted to be coupled in fluid communication to an intake manifold 18 interposed in fluid communication between a combustion engine 12 and a fuel vapor recovery canister 14. Vacuum delivery conduit 64 is configured to apply a canister-purging vacuum to fuel vapor recovery canister 14 when engine 16 is running to cause atmospheric air 17 to flow into fuel vapor recovery canister 14 and entrain hydrocarbons adsorbed on a filter media stored in fuel vapor recovery canister 14 to generate a stream of fuel vapor which is drawn into engine 15 and burned as suggested in FIG. 3.

Valve housing 22 also includes a canister pipe 26C formed to include a canister passageway 26CP communicating with a first opening into the vent aperture 26V formed in the interior annular valve seat 26S and adapted to be coupled in fluid communication to fuel vapor recover canister 14 as suggested in FIG. 3. A tank pipe 26T is also included in valve housing 22 and formed to include a tank passageway 26TP communicating with a companion second opening into the vent aperture 26V formed in the interior annular valve seat 26S and adapted to be coupled in fluid communication to a vapor space 12V provided in an interior region of a fuel interior tank 12 as suggested in FIG. 1.

Tank-isolation means is provided in valve housing 22 (1) for opening the vent aperture 12V formed in the interior annular valve seat 12S as suggested in FIGS. 1 and 6 when the engine 16 is off to allow pressurized fuel vapor to flow from the vapor space 12V formed in fuel tank 12 in sequence through the tank passageway 26TP, the vent aperture 26V, and the canister passageway 26CP into fuel vapor recovery canister 14 as suggested in FIGS. 1 and 6 and alternatively to allow a vacuum extant in the vapor space 12V provided in the interior region of fuel tank 12 to draw atmospheric air from the atmosphere 17 into the fuel vapor recovery canister 14 to entrain hydrocarbons adsorbed on filter media in fuel vapor recovery canister 14 to generate fuel vapor that flows in sequence through the canister passageway 26CP, the vent aperture 26V, and the tank passageway 26TP into the vapor space 12V provided in the interior region of fuel tank 12 as suggested in FIGS. 7 and (2) for closing the vent aperture 26V during a canister purge activation cycle when engine 16 is running in response to exposure of the vacuum-transfer passageway 64P formed in vacuum delivery conduit 64 to a valve-closing vacuum generated by engine 16 and applied by intake manifold 18 as suggested in FIG. 3 so that flow or pressurized fuel vapor from fuel tank 12 and tank passageway 26T to canister passageway 26C and fuel vapor recovery canister 14 is blocked during exposure of fuel vapor recovery canister 14 to a separate canister-purging vacuum applied by intake manifold 18 so as to maximize purge of hydrocarbons from the fuel vapor recovery canister 14 during the canister purge activation cycle.

Valve housing 22 includes a valve-housing body 26 including tank pipe 26T, canister pipe 26C, and the interior annular valve seat 26S as shown in FIG. 1. Valve-housing body 26 is formed to include a first valve chamber 24 partitioned by the annular valve seat 26S to include a canister zone $Z_C$ located on one side of the annular valve seat 26S and arranged to communicate with canister passageway 26CP of canister pipe 26C via a canister-zone aperture $Z_{CA}$ formed in valve-housing body 26 to open into canister 14 and a tank zone $Z_T$ located on an opposite second side of the annular valve seat 26S and arranged to communicate with tank passageway 26TP of tank pipe 26T via a tank-zone aperture $Z_{TA}$ formed in valve-housing body 26 to open into tank passageway 26TP as suggested in FIG. 1. The tank-isolation means includes a tank-isolation, canister-purge valve 24 that is mounted for movement in first valve chamber 24C from (1) a normally opened position shown in FIG. 1 and arranged to allow flow of fuel vapor between the tank and canister passageways 26T, 26C through the first valve chamber 24C and through the vent aperture 26V formed in the interior annular valve seat 26S of valve-housing body 26 to (2) a temporarily closed position shown in FIG. 3 and arranged to block flow of fuel vapor between the tank and canister passageways 26T, 26C through the first valve chamber 24C and through the vent aperture 26V formed in the interior annular valve seat 26S of valve-housing body 26 in response to exposure of a top-side portion 24T (see FIG. 2) of tank-isolation, canister-purge valve 24 to the valve-closing vacuum extant in the vacuum-transfer passageway 64P formed in vacuum delivery conduit 64 of purge-valve actuator 61 of valve housing 22 during the canister purge activation cycle.

Tank-isolation, canister-purge valve 24 is arranged as shown, for example, in FIG. 1 to extend through the vent aperture 26V in the interior annular valve seat 26S and engage an underside of the interior annular valve seat 26S facing the tank zone $Z_T$ of the first valve chamber 24C to block flow of fuel vapor through the first valve chamber 24C and the vent aperture 26V upon movement of the tank-isolation, canister-purge valve 24 relative to the interior annular valve seat 26S to assume the closed position.

Tank-isolation, canister-purge valve 24 includes a movable plunger 42 arranged to extend through the vent aperture 26V as suggested in FIGS. 1 and 3 in the opened and closed positions of the tank-isolation, canister-purge valve 24. Tank-isolation, canister-purge valve 24 also includes a tank-isolation closure 41 located in the tank zone $Z_T$ of the first valve chamber 24C and coupled to a first end of the movable plunger 42 to move therewith to engage the underside of the interior annular valve seat 26S to close the vent aperture 26V formed in the interior annular valve seat 26S in response to movement of the tank-isolation, canister-purge valve 24 to assume the closed position as suggested in FIG. 3.

Vacuum delivery conduit 64 includes a pipe-support shell 67 arranged to mate with valve-housing body 26 to trap the outer peripheral end of the flexible diaphragm 43 between vacuum delivery conduit 64 and valve-housing body 26 as shown in FIG. 1. Pipe-support shell 27 is formed to cooperate with the top-side portion 24T of the tank-isolation, canister purge valve 24 to define an inner region 641 of the vacuum-transport passageway 64P as suggested in FIG. 1. Vacuum delivery conduit 64 further includes a manifold pipe 66 formed to include an outer region 640 of the vacuum-transport passageway 64P and coupled to pipe-support shell 67 to place the inner and outer regions 641, of the vacuum-transport passageway 64P in fluid communication with one another. The plunger-biasing spring 44 is located in the inner region 641 of the vacuum-transport passageway 64P as shown in FIG. 1.

Valve housing 22 includes a valve-bypass conduit 26B associated with the tank and canister pipes 26T, 26CP as suggested in FIGS. 1 and 3 and formed to include a bypass passageway 26BP arranged to interconnect the tank and canister passageways 26TP, 26CP in fluid communication. Tank venting system 10 further includes a pressure-relief valve 25 located in the bypass passageway 26BP and configured to move from a normally closed position (see FIG. 1) blocking flow of pressurized fuel vapor form the tank passageway 26TP into the canister passageway 26CP through the bypass passageway 26BP to an opened position (see FIG. 4) allowing flow of pressurized fuel vapor from tank passageway 26T into canister passageway 26C through bypass passageway 16BP while the tank-isolation, canister-purge valve 24 remains in the closed position during exposure of the pressure-relief valve 25 to fuel vapor in the tank passageway 26TP having a pressure in excess of a predetermined positive pressure level. Valve-bypass conduit 26B is interposed between the first and second valve chambers 24C, 25C to cause the bypass passageway 26BP to interconnect the first and second valve chambers in 24C, 25C in fluid communication.

Tank pressure-relief valve 25 includes a closure disk 51 located in the second valve chamber 25C to confront an annular pressure-relief valve seat 24S associated with tank pipe 26T and formed to include an inlet aperture 24A opening into the second valve chamber 25C. Tank pressure-relief valve 25 also includes a disk-biasing spring 52 positioned to lie in the second valve chamber 25C above closure disk 51 and configured to yieldably urge closure disk 51 to engage the annular pressure-relief valve seat 24S normally to block flow of pressurized fuel vapor from tank passageway 26TP to canister passageway 26CP through the second valve chamber 25C and the bypass passageway 26BP until pressure of fuel vapor in tank passageway 26TP exceeds the predetermined pressure level causing closure disk 51 to move away from the annular pressure relief passageway seat 24S to place tank passageway 26TP and bypass passageway 26BP in fluid communication with one another via a lower region of the second valve chamber 26C bounded in part by the annular pressure-relief valve seat 24S and closure disk 51.

The first end of the movable plunger 42 is supported for movement relative to tank-isolation closure 41 when tank-isolation closure 41 is engaged with the underside of the interior valve seat 26S between (1) a first bleed-blocking position engaging tank-isolation closure 41 and (2) a second bleed-allowing position disengaging tank-isolation closure 41 to open a first stage fuel-vapor bleed passageway in the vent passageway BP to allow flow of pressurized fuel vapor from the tank passageway 26TP into the first valve chamber 24C through the vent passageway formed in tank-isolation closure 41.

A tank venting system 210 in accordance with a second embodiment of the present disclosure is provided to control flow of air and fuel vapor between a fuel tank 12 and an emission control system that includes a fuel vapor recovery canister 14 as suggested in FIGS. 8-14. System 210 is used on board a vehicle (not shown) including an engine 16 an intake manifold 18 coupled to engine 16 and canister 14.

Tank venting system 210 includes a pneumatic fuel tank pressure regulator 220 that is coupled to the fuel vapor recovery canister 14 via a canister conduit 13 and to fuel tank 12 via a tank conduit 15 as suggested in FIG. 8. Fuel vapor recovery canister 14 has an atmospheric port 14A exposed to the atmosphere 17 and a vacuum port 14V exposed to negative pressure (e.g. vacuum) generated by engine 16 and applied by intake manifold 18. A pressure gauge 12G is coupled to fuel tank 12 as shown in FIG. 8 to determine fuel vapor pressure extant in a vapor space 12V provided above liquid fuel 12F in an interior region of fuel tank 12.

Fuel vapor recovery canister 14 is used to capture and store hydrocarbons contained in fuel vapor discharged from fuel tank 12 through fuel tank pressure regulator 220. Canister 14 may be a carbon canister or other suitable fuel vapor treatment device. Charcoal or other suitable filter media is located inside canister 14 and arranged to intercept fluid (e.g. fuel vapor and atmospheric air) flowing through canister 14. Hydrocarbons are adsorbed on the filter media provided in canister 14 as fuel vapor flows through such filter media.

Canister 14 is cleaned during a canister purge activation cycle as shown, for example, in FIG. 10 when engine 16 is running and a canister-purging vacuum generated in engine 16 is applied by intake manifold 18 to vacuum port 14V of fuel vapor recovery canister 14 to draw atmospheric air into canister 14 through atmospheric port 14A and cause hydrocarbons adsorbed on the filter media in canister 14 to be re-entrained in that flow of atmospheric air to create a stream of fuel vapor that is discharged from fuel vapor recovery canister 14 through vacuum port 14V and flows through intake manifold 18 into engine 16 to burn the hydrocarbons entrained in that fuel vapor stream.

Fuel tank pressure regulator 220 includes a valve housing 222, a pneumatic tank-isolation canister-purge valve 224, and a pneumatic tank pressure-relief valve 25 as suggested in FIGS. 8 and 9. Fuel vapor flow through valve housing 222 between canister and tank conduits 13, 15 is regulated by canister-purge valve 224 and pressure-relief valve 25 in response to different operational and environmental conditions applied to tank venting system 10.

Tank-isolation, canister-purge valve 224 regulates fuel vapor flow along a main flow path 26TP, 26V, 26CP through valve housing 222 to conduct fuel vapor between the canister conduit 13 that is linked to fuel vapor recovery canister 14 and the tank conduit 15 that is linked to fuel tank 12. Tank pressure-relief valve 25 regulates fuel vapor flow through a bypass passageway 26BP that bypasses a closed tank-isolation, canister-purge valve 224 to allow flow of high-pressure fuel vapor from fuel tank 12 through valve housing 222 to fuel vapor recovery canister 14 to relieve excess pressure in fuel tank 12 even though fuel vapor flow along the main flow path through valve housing 222 is blocked. As shown in FIG. 8, tank pressure-relief valve 25 is located on the canister-side of fuel tank pressure regulator 20.

Tank-isolation, canister-purge valve 224 is normally retained in an opened position to allow a free flow of fuel vapor from fuel tank 12 to fuel vapor recovery canister 14 as shown in FIGS. 8 and 13. But tank-isolation, canister-purge valve 224 is closed automatically during each canister purge activation cycle as suggested in FIG. 10 by exposure to a valve-closing vacuum generated in engine 16 and applied by intake manifold 18 to the tank-isolation, canister-purge valve 224 via a control vacuum-transfer passageway 64P formed in a vacuum delivery conduit 64 that is included in fuel tank pressure regulator 220 as shown in FIGS. 8-10. During such a canister purge activation cycle, fuel tank pressure regulator 220 does not use any vacuum generated by engine 16 to pull fuel vapor from fuel tank 12 to fuel vapor recovery canister 14 through valve housing 222 of fuel tank pressure regulator 220. Instead, most of that engine vacuum is used to cleanse fuel vapor recovery canister 14 during a canister purge activation cycle and only some of that vacuum (e.g. the valve-closing vacuum in vacuum delivery conduit 64) is used to activate tank-isolating canister-purge valve 224 as suggested in FIG. 10 to block flow of fuel vapor from fuel tank 12 to fuel vapor recovery canister 14 through valve housing 222. Fuel tank pressure regulator 220 is configured to manage the flow of fuel vapor through valve housing 222 pneumatically in accordance with the present disclosure without an electronic control and to maximize hydrocarbon cleaning of fuel vapor recovery canister 14 during a canister purge activation cycle.

Tank pressure-relief valve 25 is normally closed as suggested in FIGS. 8 and 10 to allow flow of fuel vapor through valve housing 222 to be managed by tank-isolation, canister-purge valve 224. However, tank pressure-relief valve 225 is configured to open automatically as shown in FIG. 11 in response to excessive fuel vapor pressure extant in vapor space 12V of fuel tank 12 when tank-isolation, canister-purge valve 224 is closed to allow such highly pressurized fuel vapor to exit fuel tank 12 and bypass the closed canister-purge valve 224 to reduce the pressure inside fuel tank 12 and vent excess tank pressure through valve housing 222 using a bypass passageway 26BP to fuel vapor recovery canister 14.

Valve housing 222 of fuel tank pressure regulator 220 incudes a body 226, a cap 228 coupled to an upper portion of body 226, and a floor 230 coupled to a lower end of body 226 as suggested in FIGS. 8 and 9. Valve-housing body 226 includes a tank pipe 26T formed to include a tank passageway 26TP coupled in fluid communication to tank conduit 15, a canister pipe 26C formed to include a canister passageway 26CP coupled in fluid communication to canister conduit 13, and an interior annular valve seat 26S formed to include a vent aperture 26V.

Valve-housing body 226 is also formed to include a first valve chamber 24C sized to received tank-isolation, canister-purge valve 224 and a second valve chamber 25C sized to receive tank pressure-relief valve 25 as suggested in FIGS. 8 and 9. Portions of tank passageway 26TP and canister passageway 26CP cooperate with vent aperture 26V to define first valve chamber 24C as suggested in FIG. 8. Vent aperture 26V opens into each of tank and canister passageways 26TP, 26CP to connect those tank and canister passageways 26TP, 26CP in fluid communication as long as vent aperture 26V remains open (i.e. unclosed by tank-isolated, canister-purge valve 224).

Tank-isolation, canister-purge valve 224 normally assumes an opened positon in first valve chamber 24C of valve-housing body 226 to allow flow of fuel vapor between tank and canister passageways 26TP, 26CP when engine 16 is not running as suggested, for example, in FIGS. 8, 13, and 14. However, when engine 16 is running and a canister purge cycle is activated to cleanse the filter media in fuel vapor recovery canister 14 as suggested, for example, in FIG. 10, a valve-closing vacuum is applied by intake manifold 18 to control vacuum-transfer passageway 64P formed in vacuum delivery conduit 64 so that the valve-closing vacuum is applied to the tank-isolation, canister-purge valve 224 to cause valve 224 to move in first valve chamber 24C of valve-housing body 226 relative to valve housing 222 from the opened position shown in FIG. 8 in which vent aperture 26V is opened to a closed position shown in FIG. 10 in which vent aperture 26V is closed to block flow of pressurized fuel tank vapor from tank passageway 26TP through vent aperture 26V to canister passageway 26CP, canister conduit 13, and fuel vapor recovery canister 14. As a result, pressurized fuel vapor form fuel tank 12 does not continue to flow along the main flow path through valve housing 222 and canister conduit 13 into fuel vapor recovery canister 14 to deposit more hydrocarbons on the filler media in fuel vapor recovery canister 14 while fuel vapor recovery canister 14 is being cleansed of hydrocarbons during a canister purge activation cycle.

Tank-isolation, canister-purge valve 224 incudes a tank-isolation closure 41', a movable plunger 42', a flexible diaphragm 43, and a plunger-biasing spring 44 as suggested in FIGS. 8 and 9. Tank-isolation closure 41' is located in a tank zone $T_Z$ in tank passageway 26TP below vent aperture 26V. The flexible diaphragm 43 is located in canister passageway 26CP above vent aperture 26V. The movable plunger 42' is arranged to interconnect tank-isolation closure 41' and the flexible diaphragm 43 and to extend through vent aperture 26V as shown, for example, in FIG. 8. Plunger-biasing spring 44 is located above tank-isolation closure 41' and arranged to act against a portion of cap 228 normally to urge tank-isolation, canister-purge valve 224 to an opened positon as shown, for example, in FIGS. 8, 13, and 14 to allow fuel vapor to flow between fuel tank 12 and fuel vapor recover canister 14 through the tank passageway 26TP, vent aperture 26V, and canister passageway 26CP formed in valve-housing body 226.

Tank pressure-relief valve 25 includes a closure disk 51 and a disk-biasing spring 52 as shown, for example, in FIGS. 8 and 9. Disk-biasing spring 52 is arranged to act against a portion of cap 228 normally to urge closure disk 51 to engage an opposing annular pressure-relief valve seat 24S included in valve-housing body 226 and associated with second valve chamber 25C to close a bypass passageway 26BP provided in valve-housing body 226 as suggested in FIGS. 8, 13, and 14. Closure disk 51 includes a seal 51S and a spring-mount cup 51C coupled to the seal 51S to move therewith and configured to receive one end of disk-biasing spring 52 therein as suggested in FIGS. 8 and 9.

Tank pressure-relief valve 25 normally assumes a closed position in second valve chamber 25C of valve-housing body 226 as shown in FIG. 8 to block flow of pressurized fuel vapor in tank passageway 26TP around the closed tank-isolation, canister-purge valve 224 via a bypass passageway 26BP. However, when the fuel vapor pressure in the interior region of fuel tank 12 exceeds a predetermined level as suggested in FIG. 11, pressurized fuel vapor in tank passageway 26TP acts against an exposed underside of seal 51S of closure disk 51 to move the spring-loaded closure disk 51 upwardly in second valve chamber 25C away from the annular pressure-relief valve seat 24S to open bypass passageway 26BP so that pressurized fuel vapor can flow from tank passageway 26TP through bypass passageway 26BP into canister passageway 26CP as suggested in FIG. 11 even though vent aperture 26V remains closed due to engagement of the closed tank-isolation, canister-purge valve 224 with annular valve seat 26S.

Cap 228 of valve housing 222 is configured to be mounted on top of valve-housing body 226 to close a top opening into the first valve chamber 24C formed in valve-housing body 226 as suggested in FIGS. 8 and 9. Cap 228 includes a purge-valve actuator 61' that is linked in fluid communication to intake manifold 18 by manifold conduit 19, an actuator-support plate 62' that supports purge-valve actuator 61' and mates with valve-housing body 26, and a plate seal 63' that is interposed between valve-housing body 26 and actuator-support plate 62' to establish a fluid seal around the top opening into the first valve chamber 24C as suggested in FIGS. 8 and 9. In an illustrative embodiment, plate seal 63' is coupled to flexible diaphragm 43 of tank-isolation, canister-purge valve 224 as suggested in FIG. 10.

Purge-valve actuator 61' of cap 228 includes a vacuum delivery conduit 64 and a spring mount 65 located in an interior region of vacuum delivery conduit 64 and configured to mate with a free end of the plunger-biasing spring 44 included in tank-isolation, canister-purge valve 224 as suggested in FIGS. 8 and 9. Spring mount 65 is located in an interior region of vacuum delivery conduit 64 and configured to mate with a free end of plunger-biasing spring 44 included in tank-isolation, canister-purge valve 224 as suggested in FIGS. 8 and 9.

Vacuum delivery conduit 64 includes a manifold pipe 66 that is adapted to be coupled in fluid communication to manifold conduit 19 to receive a valve-closing vacuum applied by intake manifold 18 and a pipe-support shell 67 that is coupled to actuator-support plate 62' and mated to spring mount 65 as suggested in FIGS. 8-10. Manifold pipe 66 and pipe-support shell 67 of vacuum delivery conduit 64 cooperate to define a control vacuum-transfer passageway 64P through which a valve-closing vacuum generated by engine 16 and applied by intake manifold 18 via manifold conduit 19 is conducted to one end of tank-isolation, canister-purge valve 224 during a canister purge activation cycle as suggested in FIG. 10 to cause tank-isolation, canister-purge valve 224 to move from the opened positon shown in FIG. 8 to the closed position shown in FIG. 10 to block flow of pressurized fuel vapor from fuel tank 12 to fuel vapor recovery canister 14 through the tank passageway 26TP, vent aperture 26V, and canister passageway 26CP formed in valve housing 222 of fuel tank pressure regulator 220. Closure of tank-isolation, canister-purge valve 224 is accomplished pneumatically in accordance with the present disclosure without resort to use of electronic valve movers.

Floor 230 of valve housing 222 is configured to be mounted on the bottom of valve-housing body 226 to close a bottom opening into the first and second valve chambers, 24C, 25C formed in a valve-housing body 226 as suggested in FIGS. 8, 9, and 10. Floor 230 includes an oblong disk 231 configured to mate with valve-housing body 226 and an oblong disk seal 232 that is interposed between valve-housing body 226 and oblong disk 231 to establish a fluid seal around the bottom openings into the first and second valve chambers 24C, 25C as suggested in FIGS. 8 and 9. Oblong disk 231 comprises a plate 231P mated to disk seal 232 and an upstanding tube 231T that includes an inlet 231I and cooperates to form a portion of bypass passageway 226BP as suggested in FIGS. 9 and 10. A circular seal 231S is coupled to upstanding tube 231T to mate with valve-housing body 226 as shown in FIG. 11.

As suggested in FIG. 10, tank-isolation, canister-purge valve 224 is closed when engine 16 is running because intake manifold 18 has applied a valve-closing vacuum to a top side portion 24T of the flexible diaphragm 63 included in the tank-isolation, canister-purge valve 224 located in first valve chamber 24C of valve-housing body 226 via a control vacuum-transfer passageway 64P formed in vacuum delivery conduit 64 of the purge-valve actuator 61'. Application of such a valve-closing vacuum operates to pull plunger 42' upwardly in first valve chamber 24C to compress the coiled spring 44 and move tank-isolation closure 41' upwardly to engage the underside of an annular valve seat 26S included in valve-housing body 26 to close a vent aperture 26V formed in the annular valve seat 26S. This acts to block flow of pressurized fuel vapor from fuel tank 12 and tank pipe 26T into canister pipe 26C and fuel vapor recovery canister 14 so that intake manifold 18 is active to apply a canister-purging vacuum to purge fuel vapor recovery canister 14 without drawing any additional fuel vapor from fuel tank 12 into fuel vapor recovery canister 14 during a canister purge activation cycle.

A fluid-tight seal is established as shown in FIG. 10A between a pad 42P provided at a lower end of plunger 42' and an annular pad-engaging surface 41S included in tank-isolation closure 41'. As a result, no pressurized fuel vapor extant in fuel tank 12 and tank pipe 26T is able to flow past tank-isolation closure 41' through vent aperture 26V formed in annular valve seat 26S into canister pipe 26C and then toward fuel vapor recovery canister 14 during the canister purge activation cycle.

Tank-isolation, canister-purge valve 224 is closed when engine 16 is running during the canister purge activation cycle as shown in FIG. 11. High fuel vapor pressure (in excess of a predetermined level) in fuel tank 12 and tank pipe 26T is sufficient to open the normally closed tank-pressure relief valve 25 located in second valve chamber 25C of valve-housing body 226 as suggested in FIG. 11 so that pressurized fuel vapor can flow temporarily from tank pipe 26T to canister pipe 26C through an opened bypass passageway 26BP provided in the second and first valve chambers 25C, 24C while the tank-isolation, canister-purge valve 224 remains closed until the fuel vapor pressure in fuel tank 12 is lowered to an acceptable predetermined level as suggested in FIGS. 10 and 12.

A first stage of a two-stage sequence to re-open the tank-isolation, canister-purge valve 224 is shown in FIG. 12. This first stage occurs after engine 16 has been turned off so as to allow free flow of pressurized fuel vapor from the fuel tank 12 to the fuel vapor recovery canister 14 to resume at the completion of a second stage re-opening sequence as shown in FIG. 13. In this first stage, a small amount of pressurized fuel vapor is able to bleed or otherwise flow as shown in FIG. 12A from tank pipe 26T into canister pipe 26C through a small bleed passageway provided between opposing surfaces of the pad 42P and the annular pad-engaging surface 41S of tank-installation closure 41' so as to increase the pressure of fuel vapor ($F_{VAP}$) extant above the tank-isolation closure 41' in first valve chamber 24C over time and suggesting that the bleed passageway is opened because, in part, a lifting force ($F_{VAC}$) generated by a vacuum extant in the control vacuum transfer passageway 64P of vacuum delivery conduit 64 has dissipated while the downward pushing force generated by the coiled spring 44 remains active as suggested in FIGS. 12A and 12B.

A subsequent second stage of a two-stage sequence to re-open the tank-isolation, canister-purge valve 224 is shown in FIG. 13. This second stage occurs after engine 16 has been turned off so that pressurized fuel vapor once again is able to flow freely from fuel tank 12 to fuel vapor recovery canister 14 through pneumatic fuel tank pressure regulator 220 to cause hydrocarbons entrained in the pressurized fuel vapor to be adsorbed on a filter media stored in canister 14 and to discharge filtered air from canister 14 to the atmosphere 17.

An environmental condition (e.g., fuel tank cool down during night time) in which a vacuum has developed in vapor space 12V provided in fuel tank 12 while engine 16 is off is shown in FIG. 14. Such vacuum is sufficient to draw air from atmosphere 17 into fuel vapor recovery canister 14 and re-entrain hydrocarbons that had been adsorbed on the filter media in canister 14 and to draw that fuel vapor through canister and tank pipes 26C, 26T in fuel tank pressure regulator 220 into the vapor space 12V provided in fuel tank 12.

A diagrammatic illustration is provided in FIG. 8 of a fuel tank venting system 210 comprising a vehicle fuel tank 12, a fuel vapor recovery canister 14 exposed to the atmosphere 17, a pneumatic fuel tank pressure regulator 220 for pneumatically regulating flow of fuel vapor and atmospheric air between fuel tank 12 and fuel vapor recovery canister 14, and an intake manifold 18 arranged to apply a vacuum to fuel tank pressure regulator 220 and to fuel vapor recovery canister 14 when engine 16 is running as suggested in FIGS. 10 and 11 to maximize efficiency of cleaning of filter media in fuel vapor recovery canister 14 during a canister purge activation cycle. Fuel tank pressure regulator 220 includes (1) a valve housing 226 formed to include a tank pipe 26T coupled to fuel tank 12, a canister pipe 26C coupled to fuel vapor recovery canister 14, and a purge-valve actuator 61' including a vacuum delivery conduit 64 coupled to intake manifold 18 and formed to include a vacuum-transfer passageway 64P, (2) a tank-isolation, canister-purge valve 224 that is configured to be moved between a closed position blocking fuel vapor/air flow between fuel tank 12 and fuel vapor recovery canister 14 through tank and canister pipes 26T, 26C during the canister purge activation cycle when engine 16 is running as shown in FIGS. 10 and 11 and an opened position allowing fuel vapor to flow through fuel tank pressure regulator 220 from fuel tank 12 to fuel vapor recovery canister 14 when engine 16 is off as shown in FIGS. 8 and 13, and (3) a (re-located) tank pressure-relief valve 25 that is normally closed as shown in FIGS. 8, 10, and 12-14 but is opened when high fuel vapor pressure is detected in fuel tank 12 to bypass the closed tank-isolation, canister-purge valve 224 to vent such high fuel vapor pressure from fuel tank 12 to fuel vapor recovery canister 14 through the tank and canister pipes 26T, 26C as shown in FIG. 11.

An exploded perspective assembly view of the components included in fuel tank pressure regulator 220 is provided in FIG. 9 to show that valve housing 222 includes a body 226 formed to include the tank and canister pipes 26T, 26C and broken away to show a vent aperture 24V that is formed in an annular valve seat 24S to interconnect passageways 26TP, 26CP formed in the tank and canister pipes 26T, 26C in fluid communication valve-housing body 226 further includes a first valve chamber 24C associated with the tank-isolation, canister-purge valve 224, and a shorter second valve chamber 25C associated with the tank pressure-relief valve 25, an oblong floor 230 including an oblong disk 231 configured to mate with a bottom portion of the valve-housing body to close bottom apertures opening upwardly into the first and second valve chambers 24C, 25C as suggested in FIG. 8 and an oblong disk seal 232 above the disk 231, a cap 228 configured to include the purge-valve actuator 61', an actuator-support plate 62', and a round plate seal 63' configured to mate with a top portion of the valve housing 226 to close a top aperture opening downwardly into the first valve chamber 24C. Tank-isolation, canister-purge valve 224 is sized to fit in the first valve chamber 24C and comprises, in sequence, from top to bottom, a coil spring 44, a flexible diaphragm 43 associated with the round plate seal 63', a tank-isolation closure 41' under the flexible diaphragm 43, and a plunger 42' adapted to interconnect the flexible diaphragm 43 and the tank-isolation closure 41' as shown in FIG. 8. Tank pressure-relief valve 25 is sized to fit in the second valve chamber 25C as suggested in FIGS. 8 and 9.

Tank-isolation, canister-purge valve 224 is closed when the engine 16 is running as suggested in FIG. 10 because intake manifold 18 has applied a valve-closing vacuum to a top side of the flexible diaphragm 43 included in tank-isolation, canister-purge valve 224 located in first valve chamber 24C of valve-housing body 226 via a vacuum-transfer passageway 64P formed in manifold pipe 66 of vacuum delivery conduit 14 of purge-valve actuator 64. This valve-closing vacuum generates a lifting force $F_{VAC}$ that functions to pull plunger 42' upwardly in first valve chamber 24C to compress the coiled spring 144 and move tank-isolation closure 41' upwardly to engage the underside of an annular valve seat 26S included in valve-housing body 226 as suggested in FIG. 10 to close a vent aperture 26V formed in annular valve seat 26S so as to block flow of pressurized fuel vapor from fuel tank 12 and tank pipe 26T into canister pipe 26C and fuel vapor recovery canister 14 so that intake manifold 18 is active to apply a canister-purging vacuum to purge the fuel vapor recovery canister 14 without drawing any additional fuel vapor from fuel tank 12 into fuel vapor recovery canister 14 during a canister purge activation cycle.

A fluid-tight seal is established as shown in FIG. 10A between a pad 42P provided at a lower end of plunger 42' and a circular lower rim 41S of a seal ring 41R included in tank-isolation closure 41'. As a result no pressurized fuel vapor extant in fuel tank 12 and tank pipe 26T is able to flow past tank-isolation closure 41' through vent aperture 26V formed in annular valve seat 26S into canister pipe 26CP and then toward fuel vapor recovery canister 14 during the canister purge activation cycle.

Tank-isolation, canister-purge valve 224 is closed when engine is running during the canister purge activation cycle as shown in FIG. 11. High fuel vapor pressure in fuel tank 12 and tank pipe 26T is sufficient to open the normally closed tank-pressure relief valve 25 located in the second valve chamber 25C of valve-housing body 226 as shown in FIG. 11 so that pressurized fuel vapor can flow temporarily from tank pipe 26T to canister pipe 26C through an opened bypass passageway 26BP provided in the first and second valve chambers 24C, 25C while the tank-isolation, canister-purge valve 224 remains closed until the fuel vapor pressure in tank 12 is lowered to an acceptable predetermined level as suggested in FIGS. 10 and 12.

A first stage of a two-stage sequence to re-open the tank-isolation, canister-purge valve 224 is shown in FIG. 12. This first stage occurs after engine 16 has been turned off so as to allow free flow of pressurized fuel vapor from fuel tank 12 to fuel vapor recovery canister 14 to resume at the completion of a second stage re-opening sequence as shown in FIG. 13. FIG. 12A is an enlarged view of the circled region shown in FIG. 12 and shows that a small amount of pressurized fuel vapor is able to bleed or otherwise flow from tank pipe 26T into canister pipe 26C through a small bleed passageway provided between opposing surfaces of the plunger pad and the overlying circular lower rim of tank-installation closure 41' so as to increase the pressure of fuel vapor extant above the plunger pad 42P in the first valve chamber 24C over time.

A subsequent second stage of a two-stage sequence to re-open the tank-isolation, canister-purge valve 224 is shown in FIG. 13. This second stage occurs after the combustion engine 16 has been turned off so that pressurized fuel vapor once again is able to flow freely from fuel tank 12 to fuel vapor recovery canister 14 through fuel tank pressure regulator 220 to cause hydrocarbons entrained in the pressurized fuel vapor to be adsorbed on a filter media stored in canister 14 and to discharge filtered air from canister 14 to the atmosphere 17. An environmental condition (e.g., fuel tank cool down during night time) in which a vacuum has developed in the vapor space 12V provided in fuel tank 12 while engine 16 is off as shown in FIG. 14. Such vacuum is sufficient to draw air from atmosphere 17 into fuel vapor recovery canister 14 and re-entrain hydrocarbons that had been adsorbed on the filter media in canister 14 and to draw that fuel vapor through canister and tank pipes 26C, 26T in the fuel tank pressure regulator 220 into the vapor space 12V provided in fuel tank 12.

Valve housing 226 further includes a floor 230 coupled to a bottom portion of valve-housing body 226 to close bottom apertures opening into the first and second valve chambers 24C, 25C as suggested in FIGS. 8 and 9. The valve-bypass conduit is coupled to floor 230 and arranged to extend into second valve chamber 25C to provide an annular pressure-relief valve seat 24S facing toward canister pipe 26C. Tank pressure-relief valve 25 includes a closure disk 51 located to confront the annular pressure-relief valve seat 24S and a valve-biasing spring 52 interposed between canister pipe 26C and the annular pressure-relief valve seat 24S for urging closure disk 51 to engage the annular pressure-relief valve seat 24S to block flow of pressurized fuel vapor from tank passageway 26TP to canister passageway 26CP until pressure of fuel vapor in tank passageway 26TP exceeds the predetermined pressure level as suggested in FIGS. 8 and 11.

Valve housing 222 further includes a cap 228 coupled to a top portion of valve-housing body 226 to close a top aperture opening into the first valve chamber 24C as suggested in FIGS. 8 and 9. Cap 228 includes purge-valve actuator 61' and an actuator-support plate 62' mated with the top portion of valve-housing body 226 and arranged to support purge-valve actuator 61' in communication with tank-isolation canister-purge valve 224 as suggested in FIG. 9. Purge-valve actuator 61' includes a manifold pipe 66 adapted to the coupled in fluid communication to intake manifold 18 and a pipe-support shell 67 arranged to interconnect actuator-support plate 62' and manifold pipe 66 and cooperate with manifold pipe 66 to form the vacuum-transfer passageway 64P.

The first end of the movable plunger 42' includes an elongated rod 42R that is arranged to extend through the vent aperture and a pad 42P coupled to an end of the elongated rod 42R and arranged to locate the elongated rod 42R between pad 42P and the second end of the movable plunger 42' as suggested in FIGS. 8 and 9. Pad 42P is arranged to engage tank-isolation closure 41' to block flow of pressurized fuel vapor from the tank passageway 26TP to the first valve chamber 24C through the first-stage fuel-vapor bleed passageway when the first end of the movable plunger 42 is located in the first bleed-blocking position as suggested in FIGS. 10 and 10A and to disengage tank-isolation closure 41' to allow flow of pressurized fuel vapor from tank passageway 26TP to first valve chamber 24C through the first-stage fuel-vapor bleed passageway when the first end of the movable plunger 42' is located in the second bleed-allowing position as suggested in FIGS. 12, 12A, and 12B.

The invention claimed is:

1. A tank venting system comprising
a valve housing including an interior annular valve seat formed to include a vent aperture, a purge-valve actuator including a vacuum delivery conduit formed to include a vacuum-transfer passageway adapted to be coupled in fluid communication to an intake manifold interposed in fluid communication between a combustion engine and a fuel vapor recovery canister and configured to apply a vacuum to the fuel vapor recovery canister when the combustion engine is running to cause atmospheric air to flow into the fuel vapor recovery canister and entrain hydrocarbons adsorbed on a filter media stored in the fuel vapor recovery canister to generate a stream of fuel vapor which is drawn into the combustion engine and burned, a canister pipe formed to include a canister passageway communicating with a first opening into the vent aperture formed in the interior annular valve seat and adapted to be coupled in fluid communication to the fuel vapor recovery canister, and a tank pipe formed to include a tank passageway communicating with a companion second opening into the vent aperture formed in the interior annular valve seat and adapted to be coupled in fluid communication to a vapor space provided in an interior region of a fuel tank, and
tank-isolation means for opening the vent aperture formed in the interior annular valve seat when the combustion engine is off to allow pressurized fuel vapor to flow from the vapor space formed in the fuel tank in sequence through the tank passageway, the vent aperture, and the canister passageway into the fuel vapor recovery canister and alternatively to allow a vacuum extant in the vapor space provided in the interior region of the fuel tank to draw atmospheric air from the atmosphere into the fuel vapor recovery canister to entrain hydrocarbons adsorbed on the filter media in the fuel vapor recovery canister to generate fuel vapor that flows in sequence through the canister passageway, the vent aperture, and the tank passageway into the vapor space provided in the interior region of the fuel tank and for closing the vent aperture during a canister purge activation cycle when the combustion engine is running in response to exposure of the vacuum-transfer passageway formed in the vacuum delivery conduit to a valve-closing vacuum applied by the intake manifold so that flow of pressurized fuel vapor from the fuel tank and the tank passageway to the canister passageway and the fuel vapor recovery canister is blocked during exposure of the fuel vapor recovery canister to a separate canister-purging vacuum applied by the intake manifold so as to maximize purge of hydrocarbons from the fuel vapor recovery canister during the canister purge activation cycle.

2. The tank venting system of claim 1, wherein the valve housing includes a valve-housing body including the tank pipe, the canister pipe, and the interior annular valve seat, the valve-housing body is formed to include a first valve chamber partitioned by the annular valve seat to include a canister zone located on one side of the annular valve seat and arranged to communicate with the canister passageway of the canister pipe via a canister-zone aperture formed in the valve-housing body to open into the canister and a tank zone located on an opposite second side of the annular valve seat and arranged to communicate with the tank passageway of the tank pipe via a tank-zone aperture formed in the valve-housing body to open into the tank passageway and wherein the tank-isolation means includes a tank-isolation, canister-purge valve that is mounted for movement in the first valve chamber from a normally opened position arranged to allow flow of fuel vapor between the tank and canister passageways through the first valve chamber and through the vent aperture formed in the interior annular valve seat of the valve-housing body to a temporarily closed position arranged to block flow of fuel vapor between the tank and canister passageways through the first valve chamber and through the vent aperture formed in the interior annular valve seat of the valve-housing body in response to exposure of a top-side portion of the tank-isolation, canister-purge valve to the valve-closing vacuum extant in the vacuum-transfer passageway formed in the fuel delivery conduit of the purge-valve actuator of the valve housing during the canister purge activation cycle.

3. The tank venting system of claim 2, wherein the tank-isolation, canister-purge valve is arranged to extend through the vent aperture in the interior annular valve seat and engage an underside of the interior annular valve seat facing the tank zone of the first valve chamber to block flow of fuel vapor through the first valve chamber and the vent aperture upon movement of the tank-isolation, canister-purge valve relative to the interior annular valve seat to assume the closed position.

4. The tank venting system of claim 3, wherein the tank-isolation, canister-purge valve includes a movable plunger arranged to extend through the vent aperture in the opened and closed positions of the tank-isolation, canister-purge valve, a tank-isolation closure located in the tank zone of the first valve chamber and coupled to a first end of the movable plunger to move therewith to engage the underside of the interior annular valve seat to close the vent aperture formed in the interior annular valve seat in response to movement of the tank-isolation, canister-purge valve to assume the closed position.

5. The tank venting system of claim 4, wherein the tank-isolation, canister-purge valve further includes a flexible diaphragm having an inner end coupled to an opposite second end of the movable plunger to move therewith and an outer peripheral end coupled to the valve-housing body to form a movable canister-zone ceiling cooperating with the movable plunger to define the top-side portion and block exposure of any valve-closing vacuum extant in the vacuum-transfer passageway formed in the vacuum delivery conduit of the purge-valve actuator to the canister zone in the first valve chamber and a plunger-biasing spring acting against the purge-valve actuator to urge the movable plunger normally to move relative to the interior annular valve seat to separate the tank-isolation closure from the underside of the interior annular valve seat to open the vent aperture formed in the interior annular valve seat until a valve-closing vacuum in excess of a predetermined negative pressure is extant in the vacuum-transfer passageway formed in the vapor delivery conduit of the purge-valve actuator is exposed to the top-side portion of the tank isolation, canister-purge valve to cause the tank-isolation canister-purge valve to move to the closed position.

6. The tank venting system of claim 5, wherein the vacuum delivery conduit includes a pipe-support shell arranged to mate with the valve-housing body to trap the outer peripheral end of the flexible diaphragm between the vacuum delivery conduit and the valve-housing body and formed to cooperate with the top-side portion of the tank-isolation, canister purge valve to define an inner region of the vacuum-transport passageway and wherein the vacuum delivery conduit further includes a manifold pipe formed to include an outer region of the vacuum-transport passageway and coupled to the pipe-support shell to place the inner and outer regions of the vacuum-transport passageway in fluid communication with one another and the plunger-biasing spring is located in the inner region of the vacuum-transport passageway.

7. The tank venting system of claim 2, wherein the valve-support housing includes a valve-bypass conduit associated with the tank and canister pipes and formed to include a bypass passageway arranged to interconnect the tank and canister passageways in fluid communication and further comprising a tank pressure-relief valve located in the bypass passageway and configured to move from a normally closed position blocking flow of pressurized fuel vapor from the tank passageway into the canister passageway through the bypass passageway to an opened position allowing flow of pressurized fuel vapor from the tank passageway into the canister passageway through the bypass passageway while the tank-isolation, canister-purge valve remains in the closed position during exposure of the tank pressure-relief valve to fuel vapor in the tank passageway having a pressure in excess of a predetermined positive pressure level.

8. The tank venting system of claim 7, wherein the valve housing further includes a floor coupled to a bottom portion of the valve-housing body to close bottom apertures opening into the first and second valve chambers, the valve-bypass conduit is coupled to the floor and arranged to extend into the second valve chamber to provide an annular pressure-relief valve seat facing toward the canister pipe, and the tank pressure-relief valve includes a closure disk located to confront the annular pressure-relief valve seat and a valve-biasing spring interposed between the canister pipe and the annular pressure-relief valve seat for urging the closure disk to engage the annular pressure-relief valve seat to block flow of pressurized fuel vapor from the tank passageway to the canister passageway until pressure of fuel vapor in the tank passageway exceeds the predetermined pressure level.

9. The tank venting system of claim 8, wherein the valve housing further includes a cap coupled to a top portion of the valve-housing body to close a top aperture opening into the first valve chamber, the cap includes the purge-valve actuator and an actuator-support plate mated with the top portion of the valve-housing body and arranged to support the purge-valve actuator in communication with the tank-isolation canister-purge valve, and the purge-valve actuator includes a manifold pipe adapted to the coupled in fluid communication to the intake manifold and a pipe-support shell arranged to interconnect the actuator-support plate and the manifold pipe and cooperate with the manifold pipe to form the vacuum-transfer passageway.

10. The tank venting system of claim 7, wherein the valve-bypass conduit is interposed between the first and second valve chambers to cause the bypass passageway to interconnect the first and second valve chambers in fluid communication.

11. The tank venting system of claim 10, wherein the tank pressure-relief valve includes a closure disk located in the second valve chamber to confront an annular pressure-relief valve seat associated with the tank pipe and formed to include an inlet aperture opening into the second valve chamber and a disk-biasing spring positioned to lie in the second valve chamber above the closure disk and configured to yieldably urge the closure disk to engage the annular pressure-relief valve seat normally to block flow of pressurized fuel vapor from the tank passageway to the canister passageway through the second valve chamber and the bypass passageway until pressure of fuel vapor in the tank passageway exceeds the predetermined pressure level causing the closure disk to move away from the annular pressure relief valve seat to place the tank passageway and the bypass passageway in fluid communication with one another via a lower region of the second valve chamber bounded in part by the annular pressure-relief valve seat and the closure disk.

12. The tank venting system of claim 4, wherein the first end of the movable plunger is supported for movement relative to the tank-isolation closure when the tank-isolation closure is engaged with the underside of the interior valve seat between a first bleed-blocking position engaging the tank-isolation closure to block flow of pressurized fuel vapor from the tank passageway into the first valve chamber through a vent passageway formed in the tank-isolation closure and a second bleed-allowing position disengaging the tank-isolation closure to open a first-stage fuel-vapor bleed passageway in the vent passageway to allow flow of pressurized fuel vapor from the tank passageway into the first valve chamber through the vent passageway formed in the tank-isolation closure.

13. The tank venting system of claim 12, wherein the first end of the movable plunger includes an elongated rod that is arranged to extend through the vent aperture and a pad coupled to an end of the elongated rod and arranged to locate the elongated rod between the pad and the second end of the movable plunger and the pad is arranged to engage the tank-isolation closure to block flow of pressurized fuel vapor from the tank passageway to the first valve chamber through the first-stage fuel-vapor bleed passageway when the first end of the movable plunger is located in the first bleed-blocking position and to disengage the tank-isolation closure to allow flow of pressurized fuel vapor from the tank passageway to the first valve chamber through the first-stage fuel-vapor bleed passageway when the first end of the movable plunger is located in the second bleed-allowing position.

* * * * *